US011127210B2

United States Patent
Novak et al.

(10) Patent No.: US 11,127,210 B2
(45) Date of Patent: *Sep. 21, 2021

(54) TOUCH AND SOCIAL CUES AS INPUTS INTO A COMPUTER

(71) Applicant: MICROSOFT TECHNOLOGY LICENSING, LLC, Redmond, WA (US)

(72) Inventors: Christopher Michael Novak, Redmond, WA (US); James Liu, Bellevue, WA (US); Stephen Latta, Seattle, WA (US); Anton O. A. Andrews, Seattle, WA (US); Craig R. Maitlen, Woodinville, WA (US); Sheridan Martin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 815 days.

This patent is subject to a terminal disclaimer.

(21) Appl. No.: 15/389,098

(22) Filed: Dec. 22, 2016

(65) Prior Publication Data
US 2017/0103582 A1 Apr. 13, 2017

Related U.S. Application Data

(63) Continuation of application No. 13/689,471, filed on Nov. 29, 2012, now Pat. No. 9,536,350, which is a (Continued)

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
CPC combination set(s) only.
See application file for complete search history.

(56) References Cited

U.S. PATENT DOCUMENTS

| 4,934,773 A | 6/1990 | Becker |
| 5,016,282 A | 5/1991 | Tomono et al. |

(Continued)

FOREIGN PATENT DOCUMENTS

| CN | 101026776 A | 8/2007 |
| EP | 1710002 | 10/2006 |

(Continued)

OTHER PUBLICATIONS

"Head Fixed Eye Tracking System Specifications", Retrieved from: http://www.arringtonresearch.com/techinfo.html, Retrieved date: Jun. 10, 2011, 2 Pages.
(Continued)

*Primary Examiner* — Steven P Sax
(74) *Attorney, Agent, or Firm* — Arent Fox LLP

(57) ABSTRACT

A system for automatically displaying virtual objects within a mixed reality environment is described. In some embodiments, a see-through head-mounted display device (HMD) identifies a real object (e.g., a person or book) within a field of view of the HMD, detects one or more interactions associated with real object, and automatically displays virtual objects associated with the real object if the one or more interactions involve touching or satisfy one or more social rules stored in a social rules database. The one or more social rules may be used to infer a particular social relationship by considering the distance to another person, the type of environment (e.g., at home or work), and particular physical interactions (e.g., handshakes or hugs). The virtual objects displayed on the HMD may depend on the particular social relationship inferred (e.g., a friend or acquaintance).

15 Claims, 18 Drawing Sheets

Related U.S. Application Data continuation of application No. 13/216,647, filed on Aug. 24, 2011, now abandoned.

(51) Int. Cl.
*G02B 27/00* (2006.01)
*G06F 3/01* (2006.01)
*G06F 3/03* (2006.01)
*G06Q 10/10* (2012.01)

(52) U.S. Cl.
CPC .......... *G02B 27/0172* (2013.01); *G06F 3/011* (2013.01); *G06F 3/017* (2013.01); *G06F 3/0304* (2013.01); *G06Q 10/1095* (2013.01); *G02B 2027/014* (2013.01); *G02B 2027/0138* (2013.01); *G02B 2027/0141* (2013.01); *G02B 2027/0178* (2013.01)

(56) References Cited

U.S. PATENT DOCUMENTS

| | | | |
|---|---|---|---|
| 5,307,170 A | 4/1994 | Itsumi et al. | |
| 5,471,542 A | 11/1995 | Ragland | |
| 5,486,860 A | 1/1996 | Shiokawa et al. | |
| 5,689,619 A | 11/1997 | Smyth | |
| 5,963,371 A * | 10/1999 | Needham | H04N 13/337 359/464 |
| 6,046,712 A | 4/2000 | Beller et al. | |
| 6,053,610 A | 4/2000 | Kurtin et al. | |
| 6,069,742 A | 5/2000 | Silver | |
| 6,351,335 B1 | 2/2002 | Perlin | |
| 6,433,760 B1 | 8/2002 | Vaissie et al. | |
| 6,456,262 B1 | 9/2002 | Bell | |
| 6,466,207 B1 | 10/2002 | Gortler et al. | |
| 6,522,479 B2 | 2/2003 | Yahagi | |
| 6,578,962 B1 | 6/2003 | Amir et al. | |
| 6,597,346 B1 | 7/2003 | Havey et al. | |
| 6,618,208 B1 | 9/2003 | Silver | |
| 6,659,611 B2 | 12/2003 | Amir et al. | |
| 6,711,414 B1 | 3/2004 | Lightman | |
| 6,738,040 B2 | 5/2004 | Jahn et al. | |
| 6,760,046 B2 | 7/2004 | I'Anson et al. | |
| 6,842,175 B1 | 1/2005 | Schmalstieg | |
| 6,886,137 B2 | 4/2005 | Peck et al. | |
| 6,968,334 B2 | 11/2005 | Salmenkaita | |
| 6,975,991 B2 | 12/2005 | Basson et al. | |
| 7,130,447 B2 | 10/2006 | Aughey et al. | |
| 7,133,077 B2 | 11/2006 | Higuma et al. | |
| 7,137,069 B2 | 11/2006 | Abbott et al. | |
| 7,262,926 B2 | 8/2007 | Ohsato | |
| 7,340,438 B2 | 3/2008 | Nordman | |
| 7,362,522 B2 | 4/2008 | Ohsato | |
| 7,391,887 B2 | 6/2008 | Durnell | |
| 7,396,129 B2 | 7/2008 | Endrikhovski et al. | |
| 7,401,300 B2 | 7/2008 | Nurmi | |
| 7,401,920 B1 | 7/2008 | Kranz et al. | |
| 7,457,434 B2 | 11/2008 | Azar | |
| 7,493,153 B2 | 2/2009 | Ahmed et al. | |
| 7,522,344 B1 | 4/2009 | Curatu et al. | |
| 7,532,196 B2 | 5/2009 | Hinckley | |
| 7,532,230 B2 | 5/2009 | Culbertson et al. | |
| 7,533,988 B2 | 5/2009 | Ebisawa | |
| 7,542,210 B2 | 6/2009 | Chirieleison, Sr. | |
| 7,686,451 B2 | 3/2010 | Cleveland | |
| 7,736,000 B2 | 6/2010 | Enriquez et al. | |
| 7,805,528 B2 | 9/2010 | Park et al. | |
| 7,822,607 B2 | 10/2010 | Aoki et al. | |
| 7,843,471 B2 | 11/2010 | Doan | |
| 7,948,451 B2 | 5/2011 | Gustafsson et al. | |
| 8,032,508 B2 * | 10/2011 | Martinez | G06F 16/9535 707/708 |
| 8,184,070 B1 | 5/2012 | Taubman | |
| 8,209,183 B1 | 6/2012 | Patel | |
| 8,223,088 B1 | 7/2012 | Gomez | |
| 8,743,145 B1 | 6/2014 | Price | |
| 8,843,857 B2 * | 9/2014 | Berkes | G06F 3/0488 715/863 |
| 8,869,072 B2 * | 10/2014 | Latta | G06K 9/00342 715/863 |
| 9,111,326 B1 | 8/2015 | Worley, III | |
| 9,153,195 B2 | 10/2015 | Geisner et al. | |
| 9,213,405 B2 | 12/2015 | Perez et al. | |
| 9,323,325 B2 | 4/2016 | Perez et al. | |
| 9,400,548 B2 * | 7/2016 | Zhang | G06F 3/017 |
| 9,536,350 B2 | 1/2017 | Novak et al. | |
| 9,703,369 B1 * | 7/2017 | Mullen | A63F 13/843 |
| 10,019,962 B2 | 7/2018 | Liu | |
| 2002/0075286 A1 | 6/2002 | Yonezawa et al. | |
| 2002/0149583 A1 | 10/2002 | Segawa | |
| 2002/0158873 A1 | 10/2002 | Williamson | |
| 2004/0003133 A1 * | 1/2004 | Pradhan | H04W 48/08 719/318 |
| 2004/0008157 A1 | 1/2004 | Brubaker | |
| 2004/0109009 A1 * | 6/2004 | Yonezawa | G06T 15/20 345/632 |
| 2004/0190776 A1 * | 9/2004 | Higaki | G06F 3/017 382/190 |
| 2004/0233171 A1 * | 11/2004 | Bell | G09G 3/003 345/168 |
| 2004/0239670 A1 | 12/2004 | Marks | |
| 2005/0047629 A1 | 3/2005 | Farrell et al. | |
| 2005/0197846 A1 | 9/2005 | Pezaris | |
| 2005/0206583 A1 | 9/2005 | Lemelson | |
| 2005/0270372 A1 * | 12/2005 | Henninger | G08B 13/19686 348/143 |
| 2006/0007308 A1 | 1/2006 | Ide et al. | |
| 2006/0115130 A1 | 6/2006 | Kozlay | |
| 2006/0146012 A1 | 7/2006 | Arneson et al. | |
| 2006/0227151 A1 | 10/2006 | Bannai | |
| 2006/0250322 A1 | 11/2006 | Hall et al. | |
| 2006/0270419 A1 | 11/2006 | Crowley et al. | |
| 2007/0081726 A1 | 4/2007 | Westerman | |
| 2007/0167689 A1 | 7/2007 | Ramadas et al. | |
| 2007/0201859 A1 | 8/2007 | Sarrat | |
| 2007/0250901 A1 | 10/2007 | Mcintire et al. | |
| 2008/0002262 A1 | 1/2008 | Chirieleison | |
| 2008/0007689 A1 | 1/2008 | Silver | |
| 2008/0024392 A1 | 1/2008 | Gustafsson et al. | |
| 2008/0024597 A1 | 1/2008 | Yang et al. | |
| 2008/0037829 A1 * | 2/2008 | Givon | G06K 9/3216 382/107 |
| 2008/0084532 A1 | 4/2008 | Kurtin | |
| 2008/0117289 A1 | 5/2008 | Schowengerdt et al. | |
| 2008/0133336 A1 | 6/2008 | Altman et al. | |
| 2008/0158096 A1 | 7/2008 | Breed | |
| 2008/0181452 A1 | 7/2008 | Kwon et al. | |
| 2008/0195956 A1 | 8/2008 | Baron | |
| 2008/0198159 A1 * | 8/2008 | Liu | G08B 13/19641 345/420 |
| 2008/0211771 A1 | 9/2008 | Richardson | |
| 2009/0005961 A1 | 1/2009 | Grabowski et al. | |
| 2009/0051648 A1 * | 2/2009 | Shamaie | G06F 3/017 345/156 |
| 2009/0055739 A1 | 2/2009 | Murillo et al. | |
| 2009/0100076 A1 | 4/2009 | Hamilton, II | |
| 2009/0125590 A1 | 5/2009 | Hayano | |
| 2009/0158206 A1 | 6/2009 | Myllyla | |
| 2009/0174946 A1 | 7/2009 | Raviv et al. | |
| 2009/0187389 A1 | 7/2009 | Dobbins | |
| 2009/0187933 A1 | 7/2009 | Ritter | |
| 2009/0189974 A1 | 7/2009 | Deering | |
| 2009/0217211 A1 | 8/2009 | Hildreth | |
| 2009/0221368 A1 | 9/2009 | Yen et al. | |
| 2009/0225001 A1 | 9/2009 | Biocca et al. | |
| 2009/0233548 A1 | 9/2009 | Andersson | |
| 2009/0243968 A1 | 10/2009 | Nakazawa | |
| 2009/0284608 A1 | 11/2009 | Hong et al. | |
| 2009/0286570 A1 | 11/2009 | Pierce | |
| 2009/0287490 A1 | 11/2009 | Cragun | |
| 2009/0289955 A1 | 11/2009 | Douris | |
| 2009/0289956 A1 | 11/2009 | Douris et al. | |
| 2010/0010826 A1 | 1/2010 | Rosenthal | |
| 2010/0017728 A1 | 1/2010 | Cho et al. | |

(56) References Cited

U.S. PATENT DOCUMENTS

| | | |
|---|---|---|
| 2010/0079356 A1 | 4/2010 | Hoellwarth |
| 2010/0197399 A1 | 8/2010 | Geiss |
| 2010/0199232 A1 | 8/2010 | Mistry |
| 2010/0204984 A1 | 8/2010 | Yang |
| 2010/0231706 A1 | 9/2010 | Maguire, Jr. |
| 2010/0238161 A1 | 9/2010 | Varga et al. |
| 2010/0257252 A1 | 10/2010 | Dougherty et al. |
| 2010/0303289 A1 | 12/2010 | Polzin |
| 2010/0306647 A1 | 12/2010 | Zhang |
| 2010/0306715 A1 | 12/2010 | Geisner |
| 2010/0332668 A1 | 12/2010 | Shah et al. |
| 2011/0022196 A1 | 1/2011 | Linsky |
| 2011/0066682 A1* | 3/2011 | Aldunate ............ H04L 67/36 709/204 |
| 2011/0112934 A1 | 5/2011 | Ishihara |
| 2011/0115816 A1 | 5/2011 | Brackney |
| 2011/0126272 A1 | 5/2011 | Betzler |
| 2011/0154266 A1* | 6/2011 | Friend ................ A63F 13/06 715/863 |
| 2011/0181497 A1 | 7/2011 | Raviv |
| 2011/0188760 A1 | 8/2011 | Wright et al. |
| 2011/0205242 A1 | 8/2011 | Friesen |
| 2011/0214082 A1* | 9/2011 | Osterhout ........... G06F 1/1673 715/773 |
| 2011/0219291 A1 | 9/2011 | Lisa |
| 2011/0221656 A1* | 9/2011 | Haddick .............. G06Q 30/02 345/8 |
| 2011/0292076 A1 | 12/2011 | Wither et al. |
| 2011/0316845 A1 | 12/2011 | Roberts |
| 2012/0019557 A1 | 1/2012 | Aronsson |
| 2012/0021828 A1 | 1/2012 | Raitt et al. |
| 2012/0026277 A1 | 2/2012 | Malzbender et al. |
| 2012/0041822 A1 | 2/2012 | Landry et al. |
| 2012/0079018 A1 | 3/2012 | Rottler |
| 2012/0083244 A1 | 4/2012 | Verthein |
| 2012/0102050 A1* | 4/2012 | Button ................ G06F 16/9535 707/749 |
| 2012/0105486 A1 | 5/2012 | Lankford et al. |
| 2012/0127062 A1 | 5/2012 | Bar-zeev et al. |
| 2012/0143361 A1 | 6/2012 | Kurabayashi et al. |
| 2012/0169879 A1* | 7/2012 | Libal ................. G06Q 10/063 348/150 |
| 2012/0204222 A1 | 8/2012 | Bodi |
| 2012/0210255 A1 | 8/2012 | Ooi et al. |
| 2012/0218263 A1 | 8/2012 | Meier et al. |
| 2012/0238248 A1* | 9/2012 | Jonsson ............. G06Q 10/1095 455/413 |
| 2012/0249741 A1 | 10/2012 | Maciocci et al. |
| 2012/0263154 A1* | 10/2012 | Blanchflower ........ G06T 19/006 370/338 |
| 2012/0270578 A1 | 10/2012 | Feghali |
| 2012/0303610 A1 | 11/2012 | Zhang |
| 2013/0024577 A1 | 1/2013 | Krishnaswamy |
| 2013/0042296 A1 | 2/2013 | Hastings |
| 2013/0044128 A1 | 2/2013 | Liu et al. |
| 2013/0044130 A1 | 2/2013 | Geisner |
| 2013/0107021 A1 | 5/2013 | Maizels et al. |
| 2013/0145024 A1* | 6/2013 | Cao ................... H04L 67/22 709/224 |
| 2013/0169682 A1 | 7/2013 | Novak |
| 2014/0232750 A1* | 8/2014 | Price ................. G06T 19/006 345/633 |
| 2015/0095158 A1 | 4/2015 | Nasserbakht |

FOREIGN PATENT DOCUMENTS

| | | |
|---|---|---|
| JP | 09204287 A | 8/1997 |
| JP | 2002041234 A | 2/2002 |
| JP | 2002163670 A | 6/2002 |
| JP | 2003508808 A | 3/2003 |
| JP | 2003132068 A | 5/2003 |
| JP | 2006145922 A | 6/2006 |
| JP | 2002223458 A | 8/2009 |
| JP | 2010218405 A | 9/2010 |
| KR | 1020030054603 A | 7/2003 |
| KR | 1020030056302 A | 7/2003 |
| KR | 10-2011-0107542 | 10/2011 |
| WO | 2005124429 A1 | 12/2005 |
| WO | WO2007015184 | 2/2007 |
| WO | 2007066166 A1 | 6/2007 |
| WO | 2007085303 A1 | 8/2007 |
| WO | WO2011/045276 | 4/2011 |
| WO | WO2013023706 | 2/2013 |

OTHER PUBLICATIONS

"Helmet Mounted Display (HMD) with Built-In Eye Tracker", In National Aerospace Laboratory (NLR), Jan. 2009, 4 Pages.

"Vibrating Lens Gives Movie Camera Great Depth of Focus", In Magazine—Popular Science, vol. 140, Issue 5, May 1942, pp. 88-89.

"Visual Perception", Retrieved from: http://en.wikipedia.org/wiki/Visual_perception, Retrieved Date: Aug. 26, 2010, 6 Pages.

"Office Action and Search Report Issued in Taiwan Application No. 100140759", dated Nov. 3, 2015, 11 Pages.

"Office Action Issued in Korean Patent Application No. 10-2013-7015226", dated Mar. 21, 2018, 13 Pages.

"Office Action Issued in European Patent Application No. 11849398.0", dated Jun. 9, 2015, 5 Pages.

"Supplementary Search Report Issued in European Patent Application No. 11849398.0", dated Apr. 16, 2015, 3 Pages.

"Final Office Action Issued in U.S. Appl. No. 12/970,695", dated Jan. 16, 2014, 28 Pages.

"Office Action Issued in U.S. Appl. No. 12/970,695", dated Apr. 2, 2013, 14 Pages.

"Final Office Action Issued in U.S. Appl. No. 13/212,172", dated Sep. 18, 2014, 30 Pages.

"Final Office Action Issued in U.S. Appl. No. 13/212,172", dated Jun. 26, 2015, 40 Pages.

"Final Office Action Issued in U.S. Appl. No. 13/212,172", dated Dec. 18, 2015, 30 Pages.

"Final Office Action Issued in U.S. Appl. No. 13/212,172", dated Oct. 17, 2016, 43 Pages.

"Non-Final Office Action Issued in U.S. Appl. No. 13/212,172", dated Feb. 12, 2015, 28 Pages.

"Non-Final Office Action Issued in U.S. Appl. No. 13/212,172", dated Apr. 10, 2014, 25 Pages.

"Non-Final Office Action Issued in U.S. Appl. No. 13/212,172", dated Jun. 21, 2017, 44 Pages.

"Non-Final Office Action Issued in U.S. Appl. No. 13/212,172", dated May 10, 2016, 37 Pages.

"Non-Final Office Action Issued in U.S. Appl. No. 13/212,172", dated Sep. 16, 2015, 34 Pages.

"Final Office Action Issued in U.S. Appl. No. 13/221,770", dated Jul. 24, 2015, 35 Pages.

"Final Office Action Issued in U.S Appl. No. 14/865,410", dated Jun. 20, 2017, 38 Pages.

"Non-Final Office Action Issued in U.S Appl. No. 14/865,410", dated Nov. 13, 2017, 44 Pages.

"Non-Final Office Action Issued in U.S Appl. No. 14/865,410", dated Feb. 9, 2017, 27 Pages.

"First Office Action and Search Report Issued in Chinese Patent Application No. 201110443987.0", dated Feb. 12, 2014, 12 Pages.

"Second Office Action Issued in Chinese Patent Application No. 201110443987.0", dated Jul. 29, 2014, 10 Pages.

"Third Office Action Received for Chinese Patent Application No. 201110443987.0", dated Dec. 3, 2014, 6 Pages.

"Office Action Issued in Japanese Patent Application No. 2013-544548", dated Dec. 22, 2015, 8 Pages.

Akeley, et al., "A Stereo Display Prototype with Multiple Focal Distances", In ACM Transactions on Graphics, vol. 23, Issue 3, Aug. 8, 2004, pp. 804-813.

Barras, Colin, "Innovation: Gaze trackers eye computer garners", Retrieved from : https://www.newscientist.com/article/dn18707-innovation-gaze-trackers-eye-computer-gamers/, Mar. 26, 2010, 4 Pages.

(56) References Cited

OTHER PUBLICATIONS

Bier, et al., "Toolglass and Magic Lenses: The See-Through Interface", In Proceedings of the 20th Annual Conference on Computer Graphics and Interactive Techniques, Sep. 1, 1993, 8 Pages.
Blum, et al., "The Effect of Out-of-focus Blur on Visual Discomfort When Using Stereo Displays", In Proceedings of the International Symposium on Mixed and Augmented Reality, Oct. 13, 2010, pp. 13-17.
Cadden, R., "Nokia Has Been Fine-Tuning Eye-Tracking Glasses", Retrieved from: https://web.archive.org/web/20090909203446/http://www.symbian-guru.com/welcome/2009/09/nokia-has-been-fine-tuning-eye-tracking-glasses.html, Sep. 6, 2009, 3 Pages.
Chen, et al., "Research on Eye-gaze Tracking Network Generated by Augmented Reality Application", In Proceedings of the Second International Workshop on Knowledge Discovery and Data Mining, Jan. 23, 2009, pp. 594-597.
Ebisawa, Yoshinobu, "Unconstrained Pupil Detection Technique Using Two Light Sources and the Image Difference Method", In Visualization and Intelligent Design in Engineering and Architecture II, Jan. 1995, 11 Pages.
Gang, Wen, "Chapter 3 Gaze Estimation System", In National University of Singapore, Jan. 2004, 10 Pages.
Handa, et al., "Development of Head-Mounted Display with Eye-Gaze Detection Function for the Severely Disabled", In IEEE International Conference on Virtual Environments, Human-Computer Interfaces, and Measurement Systems, Jul. 14, 2008, pp. 140-144.
Hennessey, et al., "A Single Camera Eye-Gaze Tracking System with Free Head Motion", In Proceedings of the 2006 Symposium on Eye Tracking Research and Applications, Mar. 27, 2006, pp. 87-94.
Herbelin, et al., "Coding Gaze Tracking Data with Chromatic Gradients for VR Exposure Therapy", In Proceedings of the 17th International Conference on Artificial Reality and Telexistence, Nov. 28, 2007, 8 Pages.
Hillaire, et al., "Using an Eye-Tracking System to Improve Camera Motions and Depth-of-Field Blur Effects in Virtual Environments", In Proceedings of the IEEE Virtual Reality Conference, Mar. 8, 2008, 2 Pages.
Hollerer, et al., "Exploring MARS: Developing Indoor and Outdoor User Interfaces to a Mobile Augmented Reality System", In Computers and Graphics, vol. 23, Issue 6, Dec. 1, 1999, 12 Pages.
Hua, et al., "Using a Head Mounted Projective Display in Interactive Augmented Environments", In Proceedings of IEEE and ACM International Symposium on Augmented Reality, Oct. 29, 2001, 7 Pages.
Johnson, Joel, "How Oil-Filled Lenses are Bringing Sight to Those in Need", Retrieved from: http://gizmodo.com/5463368/how-oil-filled-lenses-are-bringing-sight-to-those-in-need, Feb. 3, 2010, 4 Pages.
Kemp, Miles, "Augmented Reality Glasses Concept by Nokia", Retrieved from: http://www.spatialrobots.com/2009/09/augmented-reality-glasses-concept-by-nokia/, Sep. 23, 2009, 6 Pages.
Kim, et al., "Vision-Based Eye-Gaze Tracking for Human Computer Interface", In Proceedings of the Conference on Systems, Man, and Cybernetics, vol. 2, Oct. 12, 1999, pp. 324-329.
Kollenberg, et al., "Visual Search in the (Un)Real World: How Head-Mounted Displays Affect Eye Movements, Head Movements and Target Detection", In Proceedings of the 2010 Symposium on Eye-Tracking Research & Applications, Mar. 22, 2010, 4 Pages.
Kumar, Manu, "Gaze-Enhanced User Interface Design", In HCI Group of Stanford University, Aug. 1, 2013, 3 Pages.
Lee, et al., "Robust Gaze Tracking Method for Stereoscopic Virtual Reality Systems", In International Conference on Human-Computer Interaction, Jul. 22, 2007, pp. 700-709.
Liarokapis, Fotis, "An Augmented Reality Interface for Visualizing and Interacting with Virtual Content", In Journal of Virtual Reality, vol. 11, Issue 1, Mar. 1, 2007, 18 Pages.
Liu, et al., "Real Time Auto-Focus Algorithm for Eye Gaze Tracking System", In Proceedings of the International Symposium on Intelligent Signal Processing and Communication Systems, Nov. 28, 2007, pp. 742-745.
Nilsson, et al., "Hands Free Interaction with Virtual Information in a Real Environment: Eye Gaze as an Interaction Tool in an Augmented Reality System", In Journal of the PsychNology, vol. 7, Issue 2, Aug. 2009, pp. 175-196.
Selker, "Visual Attentive Interfaces,"—Published Date: Oct. 2004, BT Technology Journal, http://web.media.mit.edu/~walter/bttj/Paper16Pages146-150.pdf.
Guan, "Real-Time 3D Pointing Gesture Recognition for Natural HCI,"—Published Date: Jun. 25-27, 2008 http://ieeexplore.ieee.org/stamp/stamp.jsp?tp=&arnumber=4593304.
Gade, "Person Localization in a Wearable Camera Platform towards Assistive Technology for Social Interactions,"—Retrieved Date: May 5, 2011, http://www.ubicc.org/files/pdf/7_424.pdf.
Depalma, "Leveraging Online Virtual Agents to Crowdsource Human-Robot Interaction,"—Retrieved Date: May 5, 2011, http://crowdresearch.org/blog/?p=68.
Ajanki, et al. "Contextual Information Access with Augmented Reality." In Proceedings of IEEE International Workshop on Machine Learning for Signal Processing (MLSP), Aug. 29-Sep. 1, 2010, pp. 95-100.
Ajanki, et al., "Ubiquitous Contextual Information Access with Proactive Retrieval and Augmentation", Proceedings of the Fourth International Workshop in Ubiquitous Augmented Reality (IWUVR 2010), May 17, 2010, 5 pages.
Banks, "All Friends are NOT Created Equal: An Interaction Intensity based Approach to privacy in online Social Networks," Published Date: Aug. 29-31, 2009, http://ieeexplore.ieee.org/stamp/stamp.jsp?tp=&arnumber=5283725.
Beach, "Touch Me wE@r:Getting Physical with Social Networks," Published Date: Aug. 30, 2009, http://www.aaronbeach.com/publications/beachSCMPS09.pdf.
Buchegger, "Ubiquitous Social Networks," Published Date: Jan. 6-7, 2009, http://www.peerson.net/papers/ubicompSB.pdf.
Gong, "Dynamic Privacy Management in Pervasive Sensor Networks," Published Date: Nov. 10-12, 2010, http://www.media.mit.edu/resenv/nono/files/gong_ami10.pdf.
Laibowtiz, "Wearable Sensing for Dynamic Management of Dense Ubiquitous Media," Published Date: Jun. 3-5, 2009, http://ieeexplore.ieee.org/stamp/stamp.jsp?tp=&arnumber=5226924.
Yoneki, "The Importance of Data Collection for Modelling Contact Networks," Published Date: Aug. 29-31, 2009, http://ieeexplore.ieee.org/stamp/stamp.jsp?tp=&arnumber=5283004.
Reitmayr, G., & Schmalstieg, D. (2004). Collaborative augmented reality for outdoor navigation and information browsing (pp. 31-41). na., "http://data.icg.tugraz.at/~dieter/publications/Schmalstieg_072.pdf".
PCT International Search Report dated Nov. 28, 2012, PCT Patent Application PCT/US2012/051954.
PCT Written Opinion of the International Searching Authority dated Nov. 28, 2012, PCT Patent Application PCT/US2012/051954.
PCT International Search Report dated Jan. 14, 2013, PCT Patent Application No. PCT/US2012/052136.
PCT Written Opinion of the International Searching Authority, PCT Patent Application No. PCT/US2012/052136.
U.S. Appl. No. 13/216,153, filed Aug. 23, 2011.
U.S. Appl. No. 13/689,453, filed Nov. 29, 2012.
Office Action dated Aug. 5, 2013, U.S. Appl. No. 13/689,453.
Response to Office Action dated Nov. 5, 2013, U.S. Appl. No. 13/689,453.
Office Action dated Mar. 14, 2014, U.S. Appl. No. 13/689,453.
Response to Office Action dated Jun. 29, 2015, U.S. Appl. No. 13/689,453.
Office Action dated Mar. 27, 2015, U.S. Appl. No. 13/689,453.
Office Action dated Nov. 19, 2015, U.S. Appl. No. 13/689,453.
Response to Office Action dated Feb. 26, 2016, U.S. Appl. No. 13/689,453.
Office Action dated Apr. 11, 2016, U.S. Appl. No. 13/689,453.
Response Office Action dated Jul. 17, 2016, U.S. Appl. No. 13/689,453.
Office Action dated Aug. 8, 2016, U.S. Appl. No. 13/689,453.

(56) References Cited

OTHER PUBLICATIONS

Response to Office Action dated Sep. 26, 2016, U.S. Appl. No. 13/689,453.
Notice of Allowance dated Oct. 5, 2016, U.S. Appl. No. 13/689,453.
U.S. Appl. No. 14/865,410, filed Sep. 25, 2015.
Office Action dated Sep. 12, 2013, U.S. Appl. No. 13/361,923.
Response to Office Action dated Mar. 9, 2014, U.S. Appl. No. 13/361,923.
Office Action dated May 15, 2014, U.S. Appl. No. 13/361,923.
Response to Office Action dated Oct. 15, 2014, U.S. Appl. No. 13/361,923.
Office Action dated Jan. 26, 2015, U.S. Appl. No. 13/361,923.
Response to Office Action dated Apr. 10, 2015, U.S. Appl. No. 13/361,923.
Notice of Allowance dated May 28, 2015, U.S. Appl. No. 13/361,923.
U.S. Appl. No. 13/216,647, filed Aug. 24, 2011.
Office Action dated Apr. 15, 2016, U.S. Appl. No. 13/689,471.
Response to Office Action dated Jul. 15, 2016, U.S. Appl. No. 13/689,471.
Notice of Allowance dated Aug. 26, 2016, U.S. Appl. No. 13/689,471.
"Supplemental Notice of Allowance Issued in U.S. Appl. No. 13/689,471", dated Sep. 22, 2016, 4 Pages.
"Office Action Issued in Argentina Patent Application No. P110104752", dated Jun. 1, 2017, 6 Pages.
"Office Action Issued in Argentina Patent Application No. P110104752", dated Nov. 15, 2016, 7 Pages.
"Office Action Issued in Argentina Patent Application No. P110104752", dated Feb. 1, 2017, 8 Pages.
Partala, et al., "Pupil Size Variation as an Indication of Affective Processing", In International Journal of Human-Computer Studies, vol. 59, Issue 1-2, Jul. 1, 2003, pp. 185-198.
"International Search Report and Written Opinion Issued in PCT Patent Application No. PCT/US2011/063350", dated Apr. 24, 2012, 10 Pages.
Peters, Brandon, "Pupil Size Can Objectively Identify Sleepiness, Sleep Deprivation", Retrieved from: https://www.verywellhealth.com/pupil-size-can-objectively-identify-sleepiness-3014838, Mar. 25, 2010,1 Page.
Pomplun, et al., "Using Pupil Size as a Measure of Cognition Workload in Video-Based Eye-Tracking Studies", In Department of Computer Science, University of Massachusetts Boston, Jan. 2009, 37 Pages.
Reale, et al., "Viewing Direction Estimation Based on 3D Eyeball Construction for HRI", In IEEE Computer Society Conference on Computer Vision and Pattern Recognition Workshops, Jun. 13, 2010, pp. 24-31.
Ren, et al., "Tunable-Focus Liquid Lens Controlled Using a Servo Motor", In Optics Express, vol. 14, Issue 18, Sep. 4, 2006, pp. 8031-8036.
Rolland, et al., "Displays—Head-Mounted", In Encyclopedia of Optical Engineering, Jan. 2005, 16 Pages.
Villanueva, et al., "Geometry Issues of Gaze Estimation", In Book Advances in Human Computer Interaction , Oct. 1, 2008, pp. 513-534.
Zioneyez, "A Social Media Company [online]", Retrieved from: https://web.archive.org/web/20110925141157/http://www.zioneyez.com:80/noflash.php, Retrieved Date: Jun. 15, 2011, 6 Pages.

\* cited by examiner

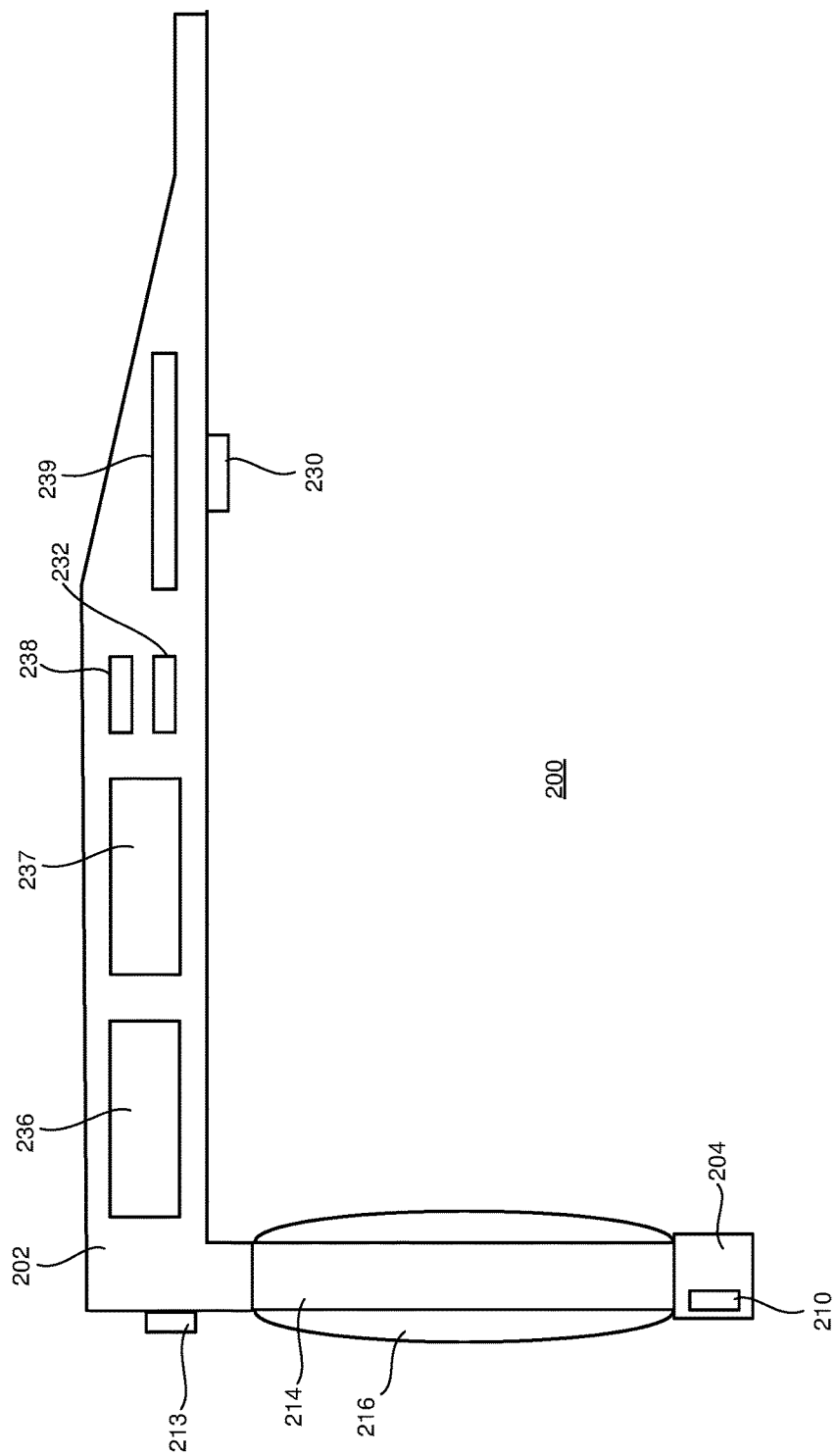

| Object ID | Privacy ID | Description of Privacy ID |
|---|---|---|
| V456 | A5 | Public information that may be transmitted to any computing device |
| V234 | A4 | Information will be transmitted to computing devices that are associated with "acquaintances" |
| V789 | A3 | Information will be transmitted to computing devices that are associated with "friends" |
| V567 | A2 | Information will be transmitted to computing devices that are associated with "family" |
| V123 | A1 | Private information that will not be transmitted |
| V747 | X3 | Information will be transmitted to computing devices that are associated with "business associates" |

FIG. 5E

| Device ID | Privacy IDs | Description of Device |
|---|---|---|
| D1211 | X3 | Co-worker David's device |
| D2342 | X3 | Co-worker Priya's device |
| D7832 | X3, A3 | Co-worker and friend Larry's device |

FIG. 5F

TOUCH AND SOCIAL CUES AS INPUTS INTO A COMPUTER

CLAIM OF PRIORITY

This application is a continuation application of U.S. patent application Ser. No. 13/689,471, entitled "TOUCH AND SOCIAL CUES AS INPUTS INTO A COMPUTER", filed Nov. 29, 2012, which is a continuation application of U.S. patent application Ser. No. 13/216,647, entitled "TOUCH AND SOCIAL CUES AS INPUTS INTO A COMPUTER," by Novak et al., filed Aug. 24, 2011, incorporated herein by reference in its entirety.

BACKGROUND

The concept of mixed reality includes the concept of augmented reality. Augmented reality relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment.

Some mixed reality environments enable the perception of real-time interaction between real objects (i.e., objects existing in a particular real-world environment) and virtual objects (i.e., objects that do not exist in the particular real-world environment). In order to realistically integrate the virtual objects into a mixed reality environment, a mixed reality system typically performs several steps including mapping and localization. Mapping relates to the process of generating a map of the real-world environment. Localization relates to the process of locating a particular point of view or pose relative to the map of the real-world environment. A fundamental requirement of many mixed reality systems is the ability to localize the pose of a mobile device moving within a real-world environment in real-time in order to determine the particular view associated with the mobile device that needs to be augmented.

SUMMARY

Technology is described for automatically displaying virtual objects within a mixed reality environment. In some embodiments, a see-through head-mounted display device (HMD) identifies a real object (e.g., a person or book) within a field of view of the HMD, detects one or more interactions associated with real object, and automatically displays virtual objects associated with the real object if the one or more interactions involve touching or satisfy one or more social rules stored in a social rules database. The one or more social rules may be used to infer a particular social relationship by considering the distance to another person, the type of environment (e.g., at home or work), and particular physical interactions (e.g., handshakes or hugs). The virtual objects displayed on the HMD may depend on the particular social relationship inferred (e.g., a friend or acquaintance).

One embodiment includes receiving one or more images associated with a field of view of the mobile device, identifying a particular object located within the field of view, and detecting one or more interactions between a person associated with the mobile device and the particular object. The method further includes determining whether the one or more interactions satisfy at least one social rule of one or more social rules stored in a social rules database, acquiring virtual data associated with the particular object based on the at least one social rule, and displaying the virtual data on the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 depicts one embodiment of a portion of an HMD.

FIG. 5E depicts one embodiment of table for associating virtual objects with one or more privacy settings.

FIG. 5F depicts one embodiment of a table for associating computing devices detected within a first proximity with one or more privacy settings.

DETAILED DESCRIPTION

Figure 1:
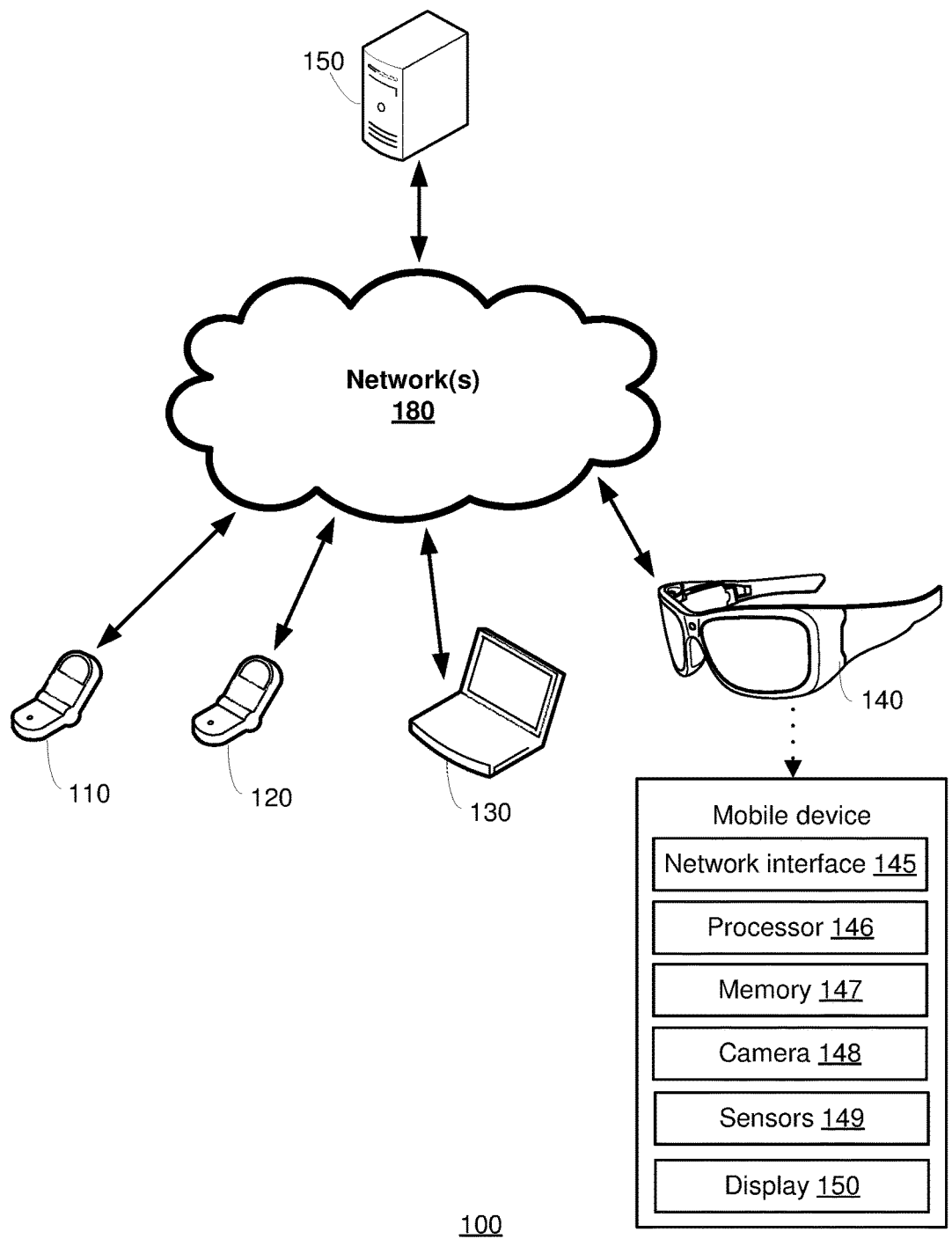
FIG. 1 is a block diagram of one embodiment of a networked computing environment in which the disclosed technology may be practiced.

Technology is described for automatically displaying virtual objects within a mixed reality environment. In some embodiments, a see-through head-mounted display device (HMD) identifies a real object (e.g., a person or book) within a field of view of the HMD, detects one or more interactions associated with real object, and automatically displays virtual objects associated with the real object if the one or more interactions involve touching or satisfy one or more social rules stored in a social rules database. The one or more social rules may be used to infer a particular social relationship by considering the distance to another person, the type of environment (e.g., at home or work), and particular physical interactions (e.g., handshakes or hugs). The virtual objects displayed on the HMD may depend on the particular social relationship inferred (e.g., a friend or acquaintance).

With the advent and proliferation of continuously-enabled and network-connected mobile devices for use with mixed reality environments, such as head-mounted display devices (HMDs), the amount of additional information available to an end user of such mobile devices at any given time is immense. For example, every real object identified by an HMD, such as a person or book, may be associated with additional information regarding the real object (i.e., metadata). The additional information associated with an identified real object may be obtained from the real object itself, a local database, or from external sources (e.g., an information database accessible via the Internet). The additional information associated with an identified real object may be displayed on an HMD as a text description. Furthermore, the additional information available to an end user may comprise one or more virtual objects (i.e., objects that do not exist in a particular real-world environment). Information associated with the one or more virtual objects may be generated locally by the HMD or received from an external computing device (e.g., another HMD).

One issue with the use of such mixed reality mobile devices is the potential for an end user to be overwhelmed with additional visual and/or audio information. For example, an end user of a continuously-enabled HMD may have his or her vision polluted by an overwhelming number of virtual objects. Furthermore, manually configuring the privacy settings or viewing permissions associated with a large number of virtual objects may be a tedious and frustrating task for the end user. Thus, the ability to automatically control and manage the amount of additional information presented to an end user of such mixed reality mobile devices without overwhelming the end user is an important objective to achieve.

The control and management of virtual objects may be automated by monitoring the natural behavior of an end user of a mixed reality mobile device and detecting particular social interactions occurring between the end user and real-world objects such as physical human-to-human social interactions. The automated control and management of virtual objects may include automatically displaying virtual objects and/or automatically sharing virtual objects between different mixed reality environments.

With respect to automatically displaying virtual objects, an end user of a mixed reality mobile device may wish to automatically view additional information regarding a real object whenever the end user interacts with the real object in a particular way. The mixed reality mobile device may monitor interactions with the real object and may automatically display additional information if the interactions involve touching of the real object and/or satisfy one or more social rules that imply a particular social relationship with the real object. The way in which the end user touches the real object and the context in which the touching of the real object takes place may also be considered when determining whether additional information is automatically displayed. For example, additional information regarding a particular book may be automatically displayed on an end user's HMD if the end user touches and opens the particular book inside a bookstore, but not if the end user touches or opens the particular book while inside a home environment.

With respect to automatically sharing virtual objects, an end user of a mixed reality mobile device may wish to automatically share portions of their mixed reality environment with another (e.g., by transferring a subset of their virtual objects to the other's HMD) and/or to automatically view portions of the other's mixed reality environment being displayed on the other's HMD (e.g., by receiving a subset of the virtual objects being projected on the other's HMD). The process of combining or layering different mixed reality environments may be automated by inferring particular relationships between the end users of different mobile devices. For example, a prolonged hug in a home environment between two end users infers a closer personal relationship than a quick handshake in a work environment. In the home environment case, sharing virtual objects that are classified as available for friends to view may be appropriate. The creator of a virtual object (e.g., a person wearing an HMD associated with the generation of the virtual object) may set privacy settings or viewing permissions associated with the virtual object. The consumer of the virtual object (i.e., a second person wearing a second HMD receiving information associated with the virtual object) may filter or restrict the display of the virtual object if the computing device from which the virtual object is generated does not meet certain criteria (e.g., is associated with an HMD that is not classified as belonging to a "friend").

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 140, mobile devices 110 and 120, laptop computer 130, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of mobile device 140 includes a network interface 145, processor 146, memory 147, camera 148, sensors 149, and display 150, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Camera 148 may capture digital images and/or videos. Sensors 149 may generate motion and/or orientation information associated with mobile device 140. Sensors 149 may comprise an inertial measurement unit (IMU). Display 150 may display digital images and/or videos. Display 150 may comprise a see-through display.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In one example, mobile device 140 comprises an HMD that provides a mixed reality environment for an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing the HMD, the end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment is performed by application server 150 (i.e., on the server side) while camera localization is performed on mobile device 140 (i.e., on the client side). The virtual objects may include a text description associated with a real-world object. The displayed text description may be automatically generated in response to the detection of one or more interactions with the real-world object that involves touching or causes one or more social rules stored in a social rules database to be satisfied.

In one example, live video images captured using a video camera on a mobile device, such as mobile device 140, may be augmented with computer-generated images of a virtual object such as a virtual monster. The resulting augmented video images may then be displayed on a display of the mobile device in real-time such that an end user of the mobile device sees the virtual monster interacting with the real-world environment captured by the mobile device. The virtual monster may be associated with a particular privacy setting (e.g., a privacy setting associated with a friend) that allows any external computing device within a particular proximity (e.g., within 10 meters) to also view the virtual monster.

In some embodiments, a mobile device, such as mobile device 140, may be in communication with a server in the cloud, such as application server 150, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. Further, the one or more virtual objects transmitted to the mobile device may depend on one or more privacy settings associated with the mobile device (e.g., the mobile device may be associated with a privacy setting that allows a general member of the public or a member of a particular group to receive the one or more virtual objects). In one example, any mobile device within a particular geographical location (e.g., within 10 meters of a particular public monument), may receive from the server a virtual object associated with the particular geographical location. If a particular mobile device within the particular geographical location is further associated with a particular privacy setting, then the server may customize the virtual object depending on the particular privacy setting. The level of detail associated with the virtual object (e.g., the resolution of the virtual objection) may also be a function of the particular privacy setting.

FIG. 2 depicts one embodiment of a portion of an HMD, such as mobile device 140 in FIG. 1. Only the right side of a head-mounted device is depicted. HMD 200 includes right temple 202, nose bridge 204, eye glass 216, and eye glass frame 214. Built into nose bridge 204 is a microphone 210 for recording sounds and transmitting the audio recording to processing unit 236. A front facing camera 213 is embedded inside right temple 202 for recording digital images and/or videos and transmitting the visual recordings to processing unit 236. Front facing camera 213 may capture color information, IR information, and/or depth information. Microphone 210 and front facing camera 213 are in communication with processing unit 236.

Also embedded inside right temple 202 are ear phones 230, motion and orientation sensor 238, GPS receiver 232, power supply 239, and wireless interface 237, all in communication with processing unit 236. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, eye glass 216 may comprise a see-through display, whereby images generated by processing unit 236 may be projected and/or displayed on the see-through display. The front facing camera 213 may be calibrated such that the field of view captured by the front facing camera 213 corresponds with the field of view as seen by a user of HMD 200. The ear phones 230 may be used to output virtual sounds associated with the images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3-D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

Figure 3A:
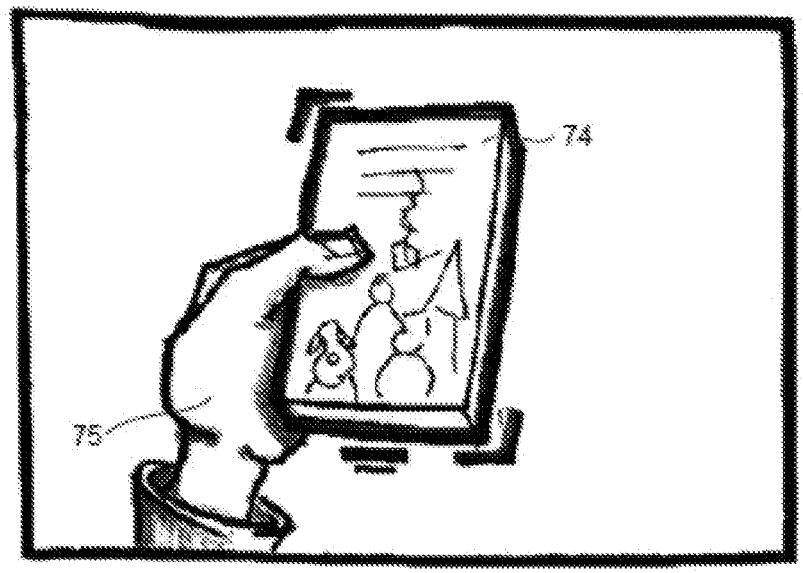
FIG. 3A depicts one embodiment of a field of view as seen by an end user wearing an HMD.

FIG. 3A depicts one embodiment of a field of view as seen by an end user wearing an HMD such as mobile device 140 in FIG. 1. As depicted, if the end user's hand 75 touches book 74 and brings book 74 within a particular distance of the HMD (e.g., 2 feet), then additional information associated with book 74 is provided to the end user. In this case, the book 74 appears to be highlighted with a green color signifying that book 74 has received good reviews. The book reviews may be acquired from online sources such as the reviews provided by online bookstores. Additional information associated with other books in the background of the end user's field of view may not be provided to the end user. In some embodiments, the end user's touching of book 74 only reveals a first level of information, however, additional information may be provided to the end user upon the issuance of one or more voice commands by the end user. Moreover, a mixed reality system may learn over time that additional information is commonly requested for particular types of books and may adapt the amount of information provided to the end user upon the end user's touching of a particular type of book.

Figure 3B:
FIG. 3B depicts one embodiment of a field of view as seen by an end user wearing an HMD.

FIG. 3B depicts one embodiment of a field of view as seen by an end user wearing an HMD such as mobile device 140 in FIG. 1. As depicted, if a particular person 76 is within a particular distance of the HMD (e.g., 3 feet) for more than a particular period of time (e.g., 30 seconds), then additional information associated with the particular person 76 is provided to the end user. In this case, a highlight box 78 is framed around the face of the particular person 76 and a text description 79 associated with particular person 76 is displayed to the end user. The text description 79 may include the name of the particular person 76, the last time a conversation with the particular person 76 took place, any common friends or interests with the particular person 76, and project and/or work status information associated with the particular person 76.

Figure 3C:
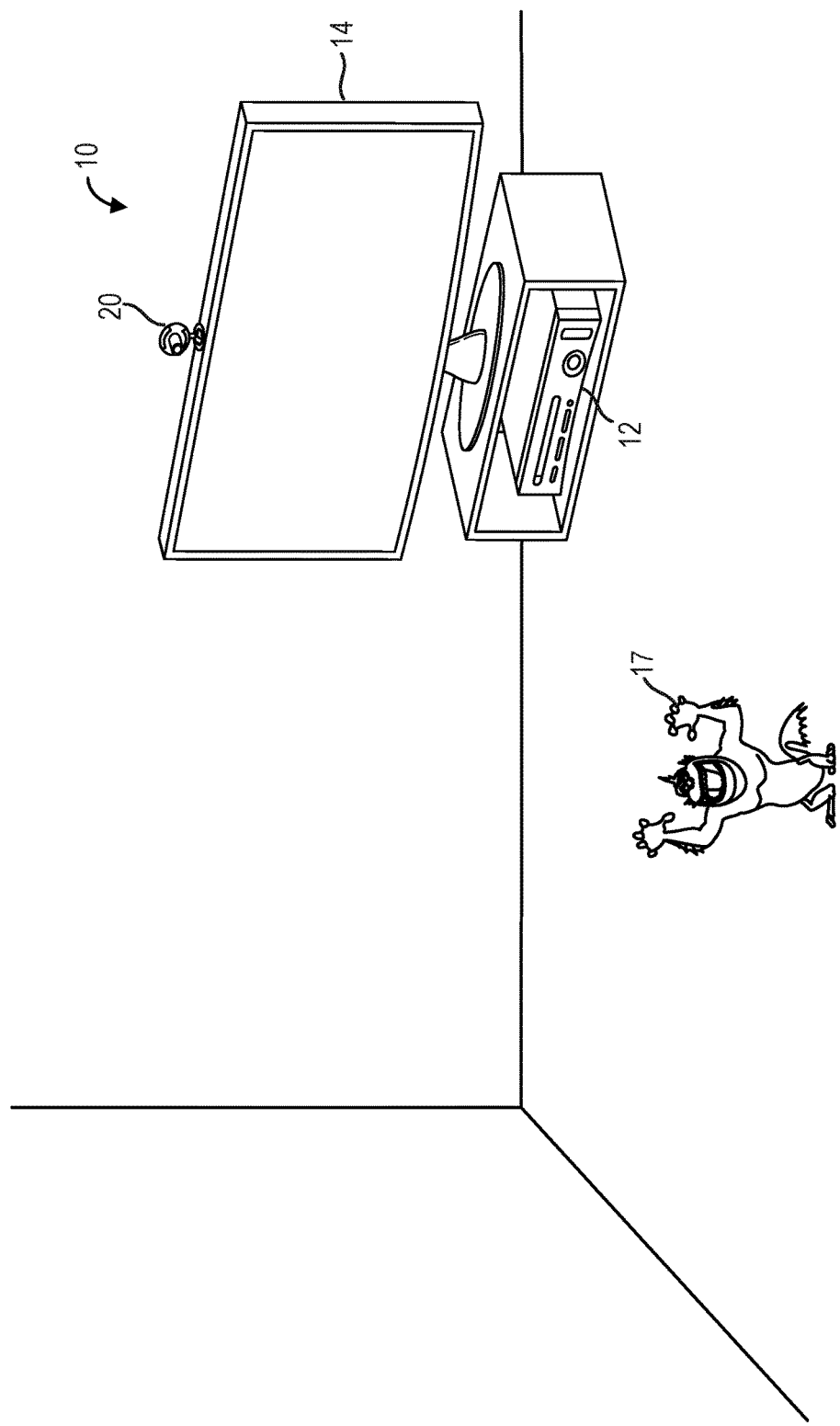
FIG. 3C depicts one embodiment of a field of view as seen by an end user wearing an HMD.

FIG. 3C depicts one embodiment of a field of view as seen by an end user wearing an HMD such as mobile device 140 in FIG. 1. As depicted, the end user may see within their field of view both real objects and virtual objects. The real objects may include computing system 10 (e.g., comprising a portion of an entertainment system). The virtual objects may include a virtual pet monster 17. As the virtual pet monster 17 is displayed or overlaid over the real-world environment as perceived through the see-through lenses of the HMD, the end user may perceive that the virtual pet monster 17 exists within the real-world environment. The virtual pet monster 17 may be generated by the HMD or by computing system 10, in which case virtual object information associated with the virtual pet monster 17 may be received by the HMD and rendered locally prior to display. In one embodiment, information associated with the virtual pet monster 17 is only provided once the HMD is within a particular distance (e.g., 20 feet) of the computing system 10. In some embodiments, the virtual pet monster 17 may comprise a form of advertising, whereby the virtual pet monster 17 is perceived to exist near a storefront whenever an HMD is within a particular distance of the storefront.

Figure 3D:
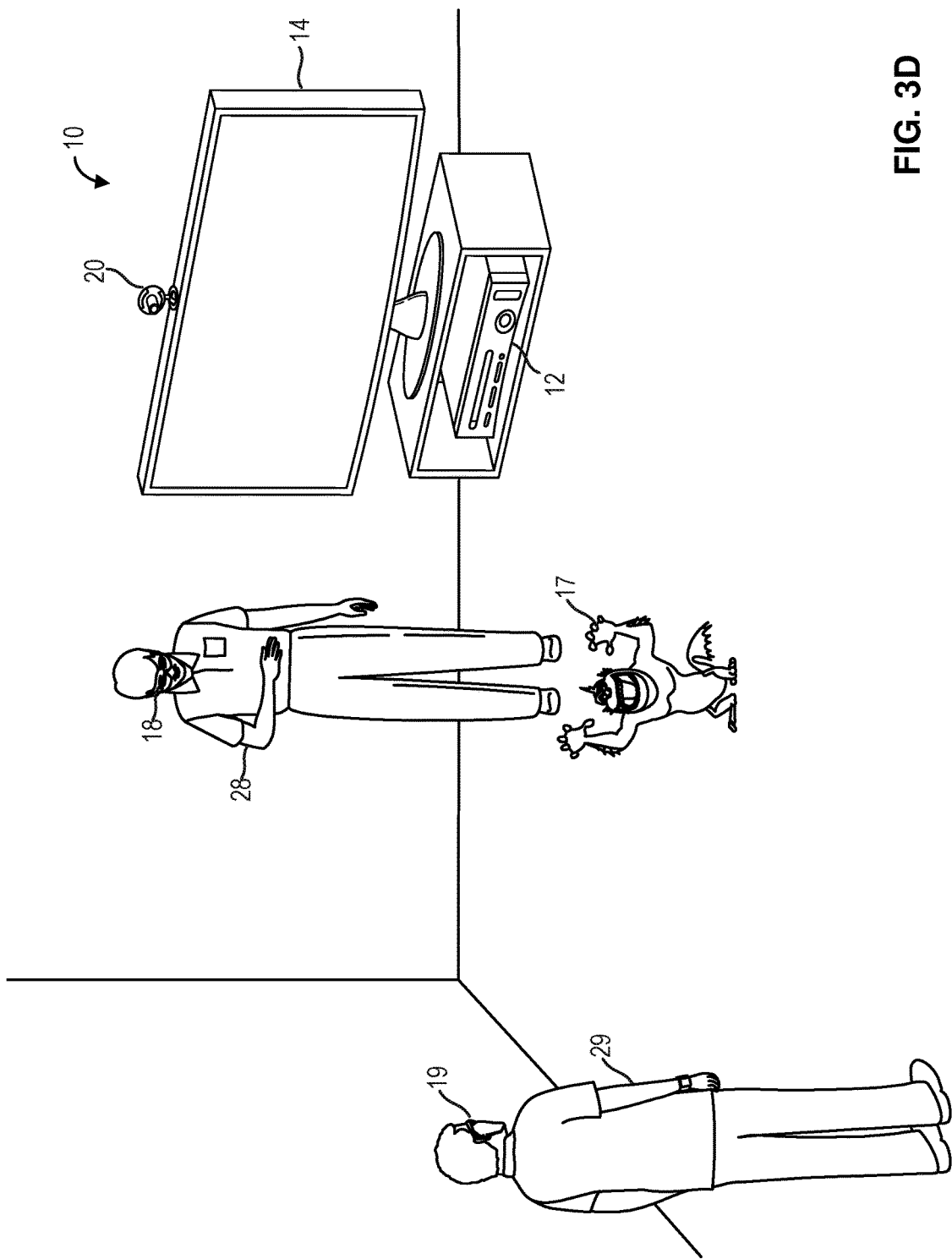
FIG. 3D depicts one embodiment of a mixed reality environment.

FIG. 3D depicts one embodiment of a mixed reality environment. The mixed reality environment includes a computing system 10 and mobile devices 18 and 19. Each of the mobile devices 18 and 19 may comprise an HMD such as HMD 200 in FIG. 2. The computing system 10 may include a computing environment 12, a capture device 20, and a display 14, all in communication with each other. Computing environment 12 may include one or more processors. Capture device 20 may include a color or depth sensing camera that may be used to visually monitor one or more targets including humans and one or more other real objects within a particular environment. In one example, capture device 20 may comprise an RGB or depth camera and computing environment 12 may comprise a set-top box or gaming console. Computing system 10 may support multiple mobile devices or clients.

As shown in FIG. 3D, user 28 wears mobile device 18 and user 29 wears mobile device 19. The mobile devices 18 and 19 may receive virtual data from computing system 10 such that a virtual object is perceived to exist within a field of view as displayed through the respective mobile device. For example, as seen by user 28 through mobile device 18, the virtual object is displayed as the back of virtual pet monster 17. As seen by user 29 through mobile device 19, the virtual object is displayed as the front of virtual pet monster 17. The rendering of virtual pet monster 17 may be performed by computing system 10 or by mobile devices 18 and 19. In one embodiment, computing system 10 renders images of virtual pet monster 17 associated with a field of view of a particular mobile device and transmits the rendered images to the particular mobile device if the particular mobile device is within a particular distance (e.g., 20 feet) of the computing system 10. In another embodiment, virtual pet monster 17 is rendered on mobile device 18, and is only transmitted to mobile device 19 if user 29 is within a particular distance (e.g., 20 feet) of mobile device 18, the environment is a home environment, and user 29 is identified as a friend.

Figure 3E:
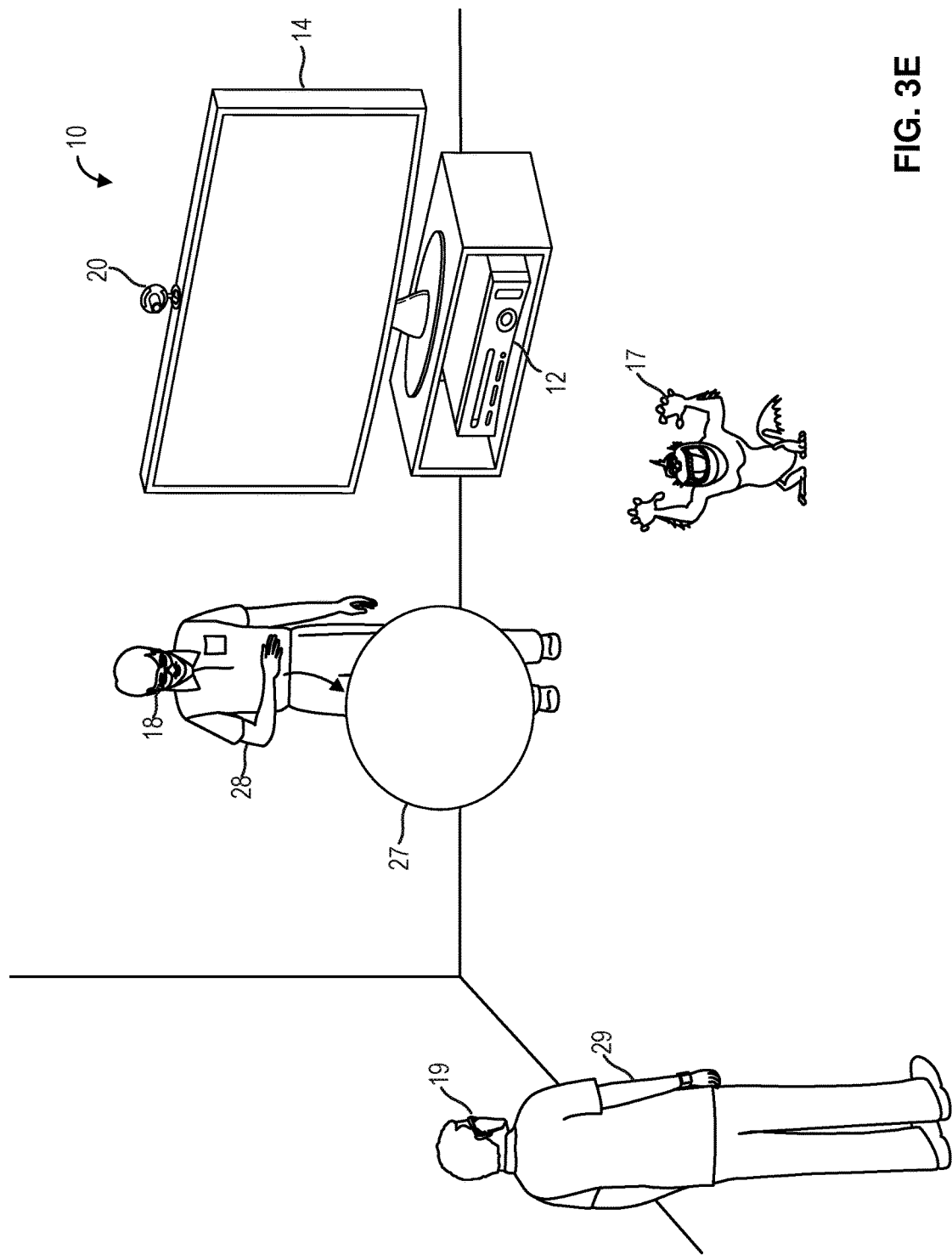
FIG. 3E depicts one embodiment of a mixed reality environment.

FIG. 3E depicts one embodiment of a mixed reality environment utilizing the computing system 10 and mobile devices 18 and 19 depicted in FIG. 3D. The computing system 10 may track and analyze virtual objects within a particular environment such as virtual ball 27 and virtual pet monster 17. The computing system 10 may also track and analyze real objects within the particular environment such as user 28 and user 29. The rendering of images associated with virtual ball 27 may be performed by computing system 10 or by mobile devices 18 and 19. In one embodiment, the virtual pet monster 17 is given a privacy setting of publicly available to any computing device and virtual ball 27 is given a privacy setting of available to only those computing devices associated with the privacy setting "friends." In this case, virtual pet monster 17 may be perceived by either user 28 or user 29, however, virtual ball 27 may only be perceived by user 28 as only mobile device 18 is associated with the privacy setting (or privacy label) "friends." In some embodiments, mobile device 18 generates virtual ball 27 and controls whether information associated with the virtual ball 27 is automatically transmitted to mobile device 19.

In one embodiment, computing system 10 tracks the position of virtual objects by taking into consideration the interaction between real and virtual objects. For example, user 28 may move their arm such that user 28 perceives hitting virtual ball 27. The computing system 10 may subsequently apply a virtual force to virtual ball 27 such that both users 28 and 29 perceive that the virtual ball has been hit by user 28. In one example, computing system 10 may register the placement of virtual ball 27 within a 3-D map of the particular environment and provide virtual data information to mobile devices 18 and 19 such that users 28 and 29 perceive the virtual ball 27 as existing within the particular environment from their respective points of view. In another embodiment, a particular mobile device may render virtual objects that are specific to the particular mobile device. For example, if the virtual ball 27 is only rendered on mobile device 18 then the virtual ball 27 would only be perceived as existing within the particular environment by user 28. In some embodiments, the dynamics of virtual objects may be performed on the particular mobile device and not on the computing system.

In one embodiment, a virtual work space may be created by automatically sharing working documents being viewed by a first co-worker on their HMD with one or more other co-workers wearing HMDs within a predetermined proximity of the first co-worker's HMD.

Figure 4:
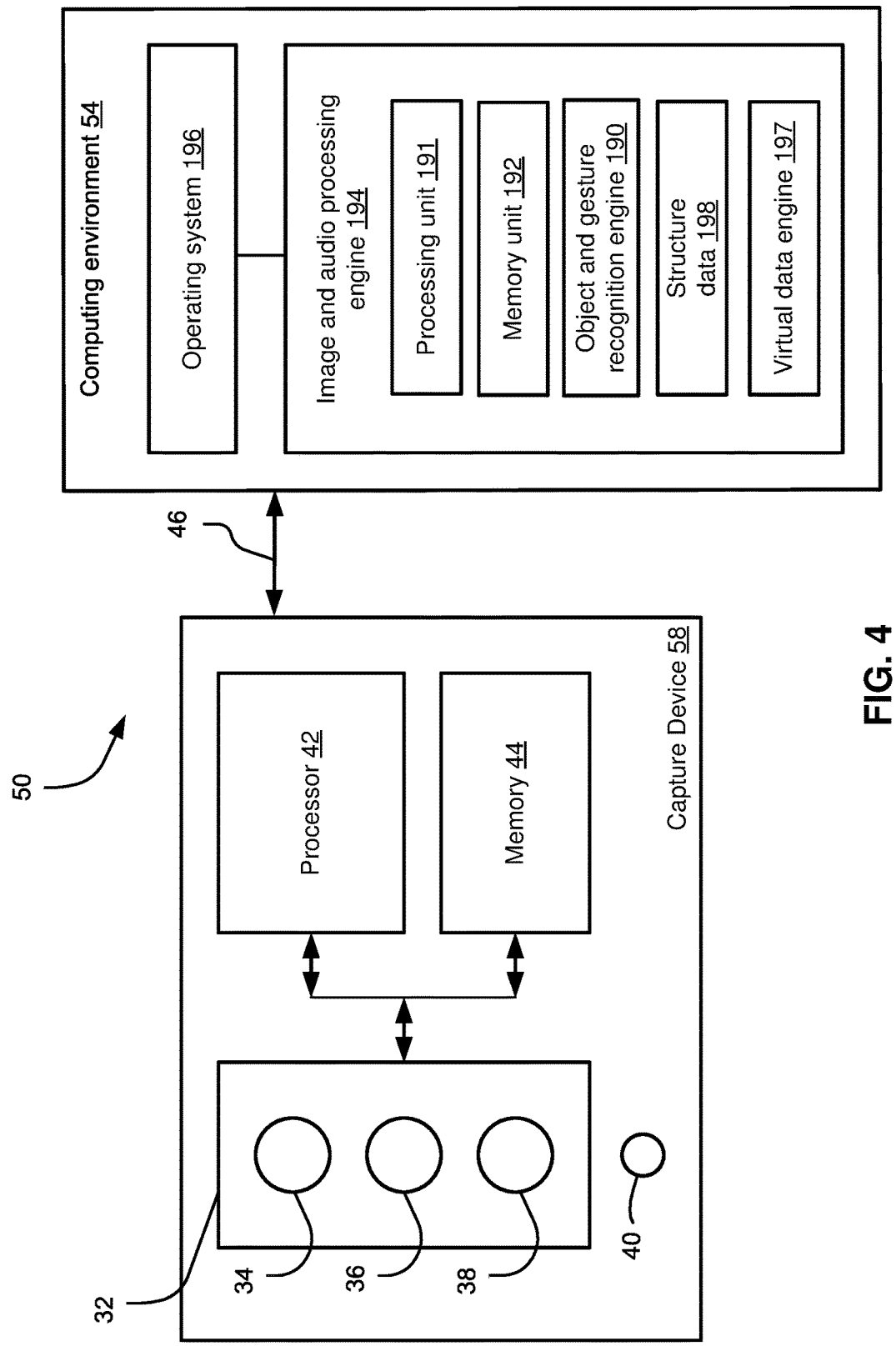
FIG. 4 illustrates one embodiment of a computing system including a capture device and computing environment.

FIG. 4 illustrates one embodiment of a computing system 50 including a capture device 58 and computing environment 54. Computing system 50 is one example of an implementation for mobile device 140 in FIG. 1. Computing system 50 may also comprise an example of an implementation for computing system 10 in FIGS. 3C-3E. For example, computing environment 54 may correspond with computing environment 12 in FIGS. 3C-3E and capture device 58 may correspond with capture device 20 in FIGS. 3C-3E.

In one embodiment, the capture device 58 may include one or more image sensors for capturing images and videos. An image sensor may comprise a CCD image sensor or a CMOS sensor. In some embodiments, capture device 58 may include an IR CMOS image sensor. The capture device 58 may also include a depth camera (or depth sensing camera) configured to capture video with depth information including a depth image that may include depth values via any suitable technique including, for example, time-of-flight, structured light, stereo image, or the like.

The capture device 58 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 58 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 58 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 58 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used or any combination and number of cameras may be used. In one embodiment, the capture device 58 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As shown in FIG. 4, capture device 58 may include a microphone 40. The microphone 40 may include a transducer or sensor that may receive and convert sound into an electrical signal.

The capture device 58 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 58.

The capture device 58 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As shown in FIG. 4, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 58 illustrated in FIG. 4 are housed in a single housing.

The capture device 58 may be in communication with the computing environment 54 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 54 may provide a clock to the capture device 58 that may be used to determine when to capture, for example, a scene via the communication link 46. In one embodiment, the capture device 58 may provide the images captured by, for example, the 3D camera 36 and/or the RGB camera 38 to the computing environment 54 via the communication link 46.

As shown in FIG. 4, computing environment 54 includes image and audio processing engine 194 in communication with operating system 196. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 58. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects, image and audio processing engine 194 may report to operating system 196 an identification of each object detected and a corresponding position and/or orientation.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing object recognition. In one example, object and gesture recognition engine 190 may include a collection of gesture filters, each comprising information concerning a gesture that may be performed by a skeletal model. The object and gesture recognition engine 190 may compare the data captured by capture device 58 in the form of the skeletal model and movements associated with it to the gesture filters in a gesture library to identify when a user (as represented by the skeletal model) has performed one or more gestures.

In one example, image and audio processing engine 194 may use the object and gesture recognition engine 190 to help interpret movements of a skeletal model and to detect the performance of a particular gesture.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23,2009; and U.S. patent application Ser. No. 12/474,655, "Gesture Tool," filed on May 29, 2009, both of which are incorporated by reference herein in their entirety.

Figure 5A:
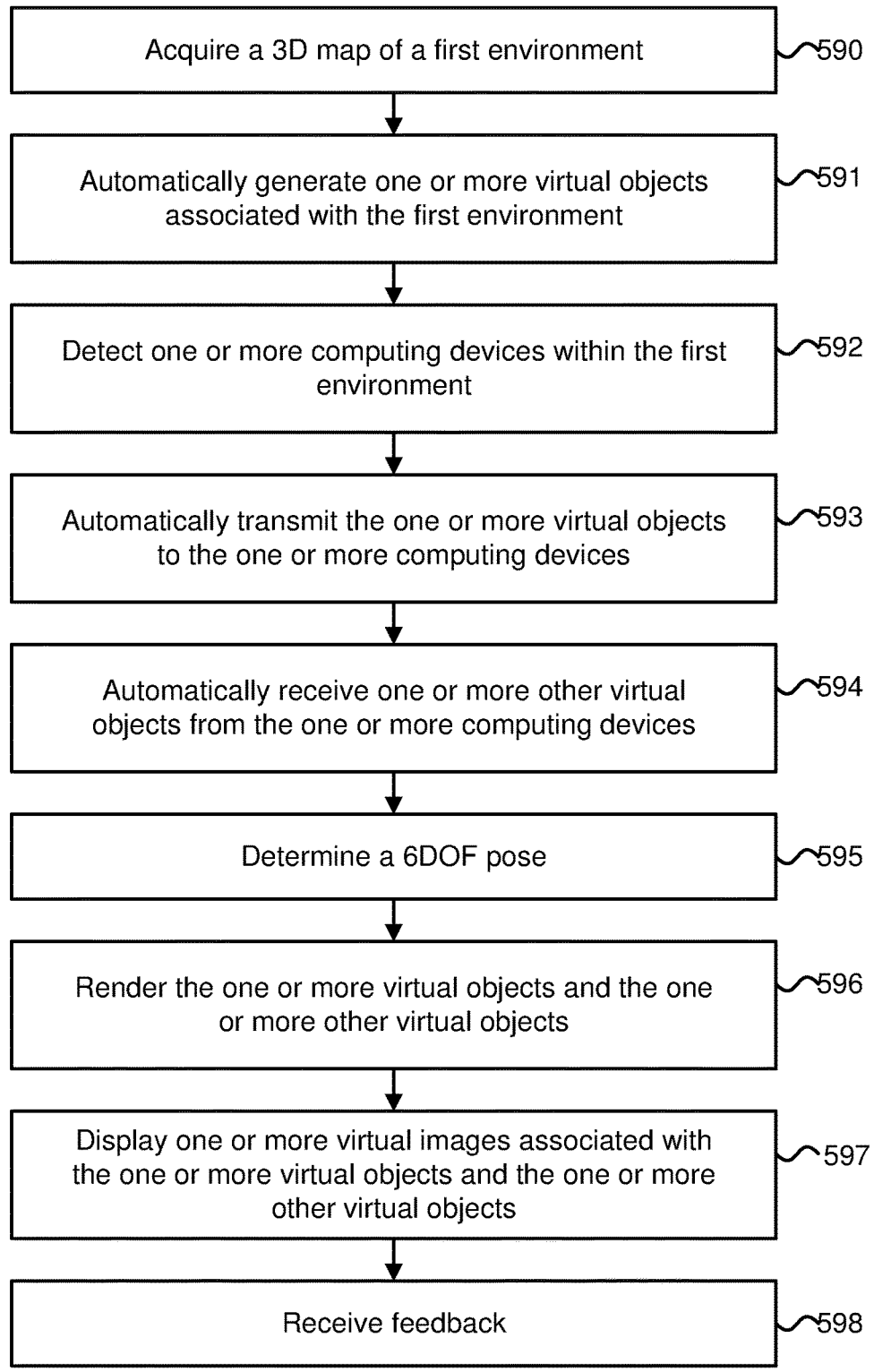
FIG. 5A is a flowchart describing one embodiment of a process for automatically generating and sharing virtual objects.

FIG. 5A is a flowchart describing one embodiment of a process for automatically generating and sharing virtual objects. The process of FIG. 5A may be performed continuously and by one or more computing devices. Each step in the process of FIG. 5A may be performed by the same or different computing devices as those used in other steps, and each step need not necessarily be performed by a single computing device. In one embodiment, the process of FIG. 5A is performed by a mobile device such as mobile device 140 in FIG. 1.

In step 590, a 3-D map of a first environment is acquired. The 3-D map may represent a particular environment such as a work or home environment, or the environment around which a mobile device is located. The 3-D map may be generated locally on a mobile device or acquired from a mapping server such as application server 150 in FIG. 1. More information regarding the generation and or acquisition of 3-D maps can be found in U.S. patent application Ser. No. 13/152,220, "Distributed Asynchronous Localization and Mapping for Augmented Reality," incorporated herein by reference in its entirety.

In step 591, one or more virtual objects associated with the first environment are automatically generated. The one or more virtual objects may include additional information associated with a real object located within the first environment such as a text description of the real object. In one embodiment, the one or more virtual objects are generated in response to the detection of one or more social interactions with a real object within the first environment. The real object may comprise an identifiable real-world object such as a book or a person. A social interaction may include touching a person in a particular way (e.g., by hugging them or shaking their hand), or taking possession of a book and opening its pages.

In step 592, one or more computing devices within the first environment are detected. The one or more computing devices may include mobile devices or non-mobile devices. The one or more computing devices may be detected via wireless signal communications or object recognition. In step 593, the one or more virtual objects may be automatically transmitted to the one or more computing devices detected in step 592. In step 594, one or more other virtual objects may be automatically received from the one or more computing devices detected in step 592.

In step 595, a six degree of freedom (6DOF) pose may be determined. The 6DOF pose may include information associated with the position and orientation of a particular mobile device. More information regarding the determination of a 6DOF pose can be found in U.S. patent application Ser. No. 13/152,220, "Distributed Asynchronous Localization and Mapping for Augmented Reality," incorporated herein by reference in its entirety.

In step 596, the one or more virtual objects and the one or more other virtual objects are rendered. The rendering of the virtual objects may be performed locally on a mobile device such as mobile device 140 in FIG. 1 or remotely on a mapping server such as application server 150 in FIG. 1. In step 597, one or more virtual images associated with the one or more virtual objects and the one or more other virtual objects are displayed. The one or more virtual images may be displayed on a mobile device display such as a see-through display of an HMD.

In step 598, feedback may be received from an end user of a mixed reality mobile device. For example, the end user may provide instructions to remove images associated with a particular virtual object. In one embodiment, an end user of an HMD may issue a voice command in order to view virtual object identifiers associated with the one or more virtual images being displayed on the HMD. The end user may then direct the HMD to remove images or update privacy settings associated with a particular virtual object identifier. Moreover, a mixed reality system may learn over time that images associated with particular virtual objects are commonly removed from an end user's HMD and may adapt to suppress the particular virtual objects from being displayed in the future.

In some embodiments, the mixed reality mobile device may prompt the end user to confirm that a privacy setting associated with a particular person be changed from one privacy setting to another. In one example, the mixed reality mobile device may request approval from the end user when changing a privacy setting from "friends" to "family," but not when changing a privacy setting from "acquaintance" to "friend."

Figure 5B:
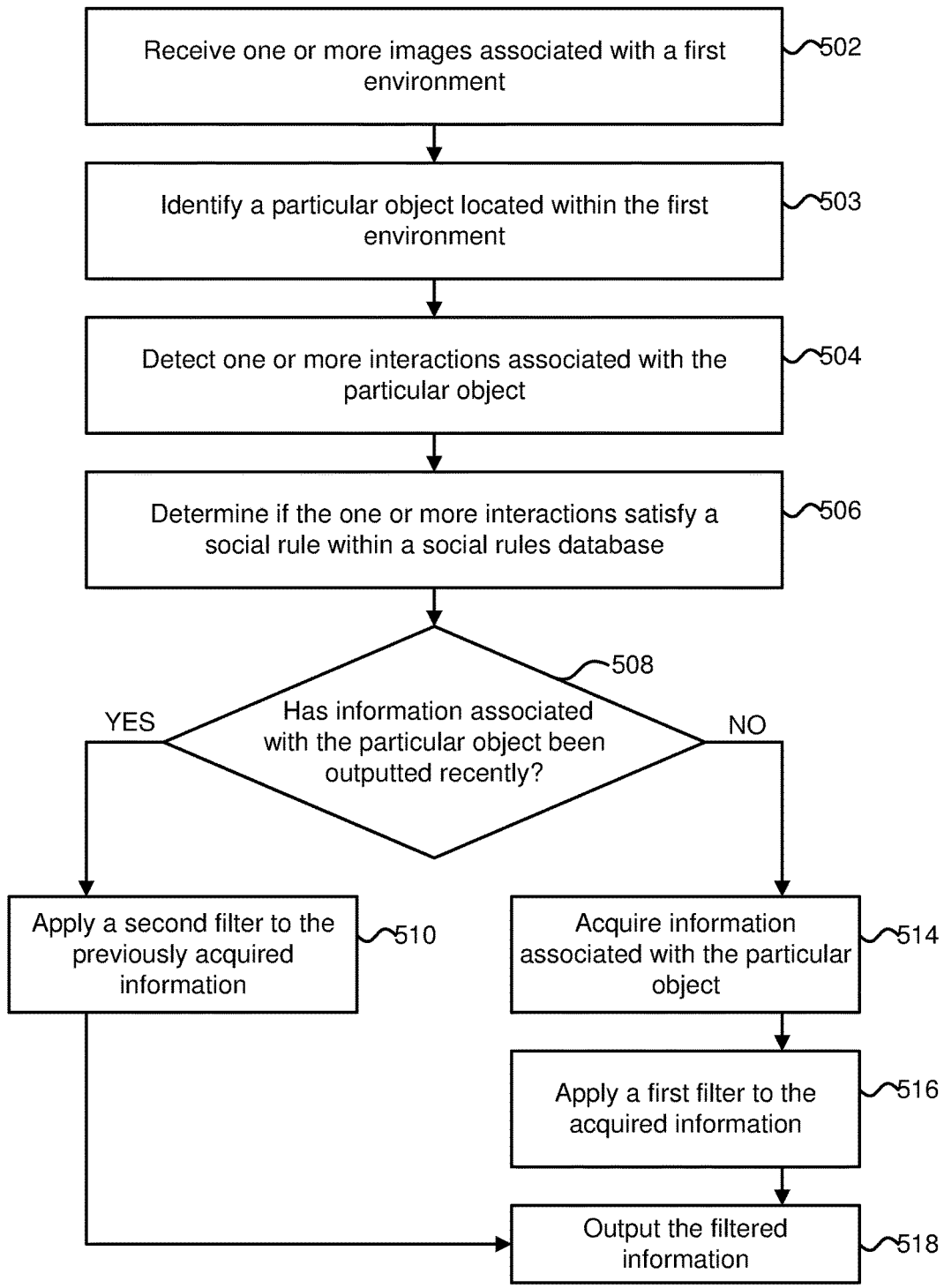
FIG. 5B is a flowchart describing one embodiment of a process for automatically generating virtual objects.

FIG. 5B is a flowchart describing one embodiment of a process for automatically generating virtual objects. The processes described in FIG. 5B is one example of a process for implementing step 591 in FIG. 5A. The process of FIG. 5B may be performed continuously and by one or more computing devices. Each step in the process of FIG. 5B may be performed by the same or different computing devices as those used in other steps, and each step need not necessarily be performed by a single computing device. In one embodiment, the process of FIG. 5B is performed by a mobile device such as mobile device 140 in FIG. 1.

In step 502, one or more images associated with a first environment are received. The one or more images may comprise depth images and/or RGB images. In step 503, a particular object located within the first environment is identified. Identification of the particular object may be performed via image processing techniques such as object recognition techniques, facial recognition techniques, or pattern matching techniques. In step 504, one or more interactions associated with the particular object are detected. The one or more interactions may include physical contact and/or touching of the particular object. If the particular object is a person, the one or more interactions may include a hug, high-five, or handshake. The one or more interactions may also include the person being in close proximity to a particular HMD and speaking towards the particular HMD.

In step 506, it is determined whether the one or more interactions satisfy a social rule within a social rules database. The social rules database may exist locally on a mobile device. Some examples of social rules may include the existence of a particular object within a predetermined distance of a mobile device (e.g., a particular person is within 10 feet of the mobile device), particular physical contact with the particular object (e.g., a prolonged hug), detection of a particular person smiling for an extended period of time, or detection of a particular person being in close proximity for an extended period of time. A particular object may be identified through object recognition, facial recognition, voice recognition, or RF identification. Social rules may also consider other human social cues such as voice stress, significant voice changes, or sudden hand movements. Biometric data such as eye blinking rate and pupil dilation of a particular person may also be considered.

In one embodiment, a social rule may require physical contact with a particular person and a corresponding calendar entry for a meeting at that time with the particular person in order to be satisfied. For example, a calendar entry may involve a meeting with a first person during a particular period of time. In this case, additional information associated with the first person may be displayed if particular physical contact occurs (e.g., a handshake) with the first person during the meeting associated with the calendar entry.

In some embodiments, complex social rules may be developed to enable the acquisition of common interests between two people that have touched or come in close proximity to a person associated with a mixed reality mobile device. For example, the person wearing an HMD may shake hands with a first person and then subsequently shake hands with a second person within a short period of time. In this case, common interests between the first person and the second person may be acquired and displayed.

Step 508 prevents redundant information from being outputted and/or displayed on a mixed reality mobile device. In step 508, if information associated with the particular object has been outputted recently (e.g., within the last 30 minutes), then step 510 is performed. Otherwise, if information associated with the particular object has not been outputted recently, then step 514 is performed. An information history file (or social record) of previously outputted information and/or the particular objects for which information has been outputted may be utilized.

In step 514, information associated with the particular object is acquired. The information may be acquired via an online database or a local database (e.g., in locally stored personal profiles). The information acquired may be based on the one or more interactions. For example, simply holding a book may cause high-level information regarding the book to be acquired, while opening the book may cause more in-depth information to the acquired. In step 516, a first filter is applied to the acquired information. The first filter may restrict the amount of information in order to prevent visual pollution from occurring. For example, the first filter may limit the number of virtual objects displayed on an HMD. The first filter may also restrict the amount of information outputted depending on the environment in which a mixed reality mobile device is located (e.g., a home or work environment).

In step 510, a second filter is applied to the previously acquired information. The second filter may simply highlight the particular object or cause only high-level information associated with the particular object to be outputted. In step 518, the filtered information is outputted. In one example, the filtered information is displayed on a see-through display of an HMD.

Figure 5C:
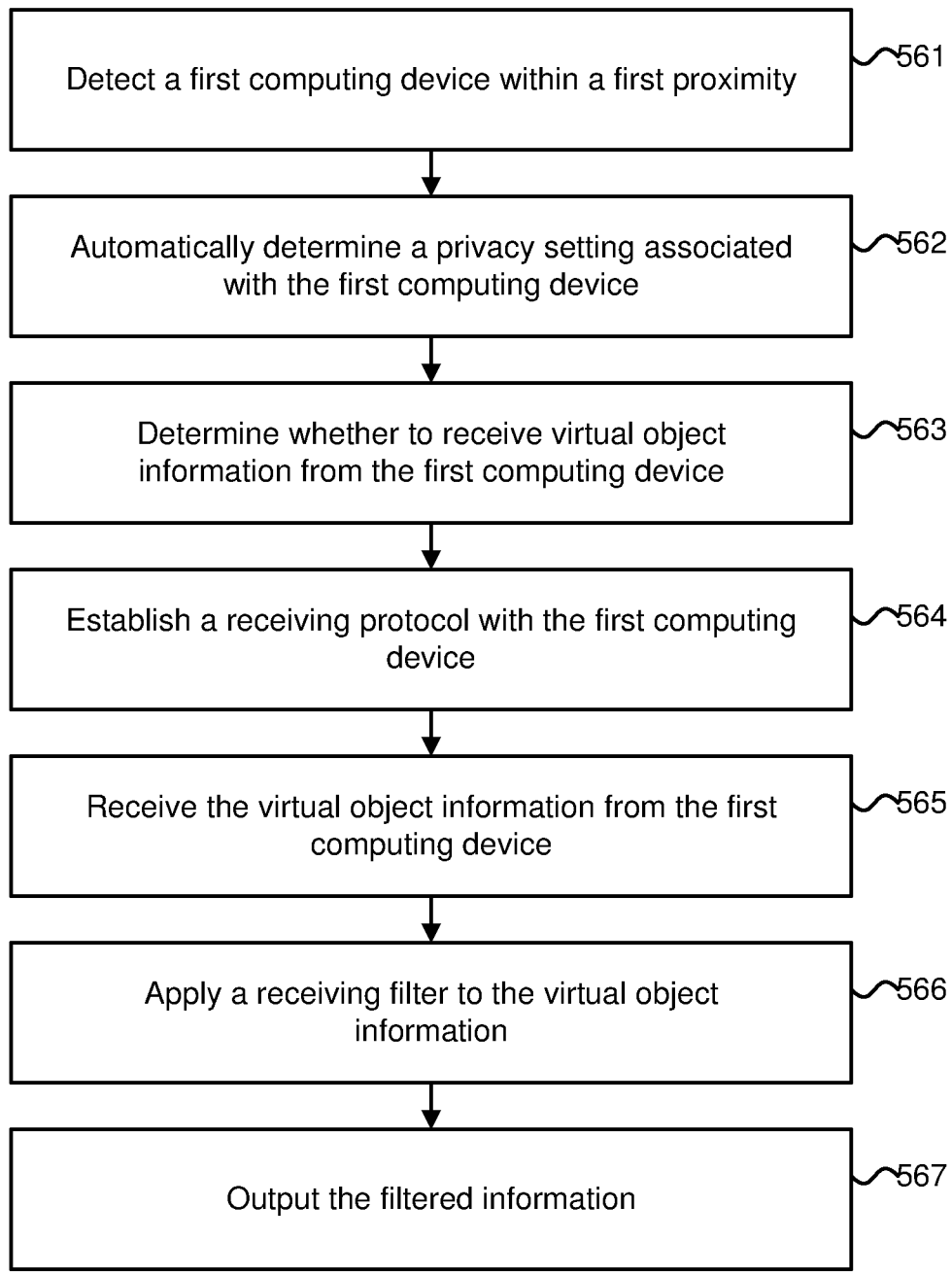
FIG. 5C is a flowchart describing one embodiment of a process for automatically receiving virtual objects from a first computing device.

FIG. 5C is a flowchart describing one embodiment of a process for automatically receiving virtual objects from a first computing device. The process described in FIG. 5C is one example of a process for implementing step 594 in FIG. 5A. The process of FIG. 5C may be performed continuously and by one or more computing devices. Each step in the process of FIG. 5C may be performed by the same or different computing devices as those used in other steps, and each step need not necessarily be performed by a single computing device. In one embodiment, the process of FIG. 5C is performed by a mobile device such as mobile device 140 in FIG. 1.

In step 561, a first computing device is detected within a first proximity of a mixed reality mobile device. In step 562, a privacy setting associated with the first computing device is automatically determined. The privacy setting may be determined by inferring a particular social relationship between a person associated with the mixed reality mobile device and another person identified by the mixed reality mobile device. The particular social relationship may be inferred by considering the distance to the other person, the type of environment in which the mixed reality mobile device is located, and particular physical interactions involving the other person.

In step 563, it is determined whether to receive virtual object information from the first computing device. In one embodiment, virtual object information may be received if the privacy setting determined in step 562 matches a predetermined input setting stored on a mixed reality mobile device. For example, a mixed reality mobile device may allow virtual object information to be automatically received from a first computing device that is associated with either a privacy setting of "friend" or "family." In some embodiments, a time limit may be used to constrain the amount of time during which the virtual object information may be received (or shared). The time limit may be predetermined by an end user of the mixed reality mobile device.

In step 564, a receiving protocol is established with the first computing device. For example, a pushing protocol that allows the first computing device to push virtual object information to a mixed reality mobile device may be established. In some embodiments, a persistent connection may be established. In step 565, the virtual object information is received from the first computing device. In step 566, a receiving filter is applied to the virtual object information. The receiving filter may restrict the amount of virtual object information in order to prevent visual pollution from occurring. For example, the receiving filter may limit the number of virtual objects displayed on the mixed reality mobile device (e.g., to only 3 objects). The receiving filter may also restrict the amount of information outputted depending on the environment in which the mixed reality mobile device is located (e.g., a home or work environment). In step 567, the filtered information is outputted. In one example, the filtered information is displayed on a see-through display of an HMD.

Figure 5D:
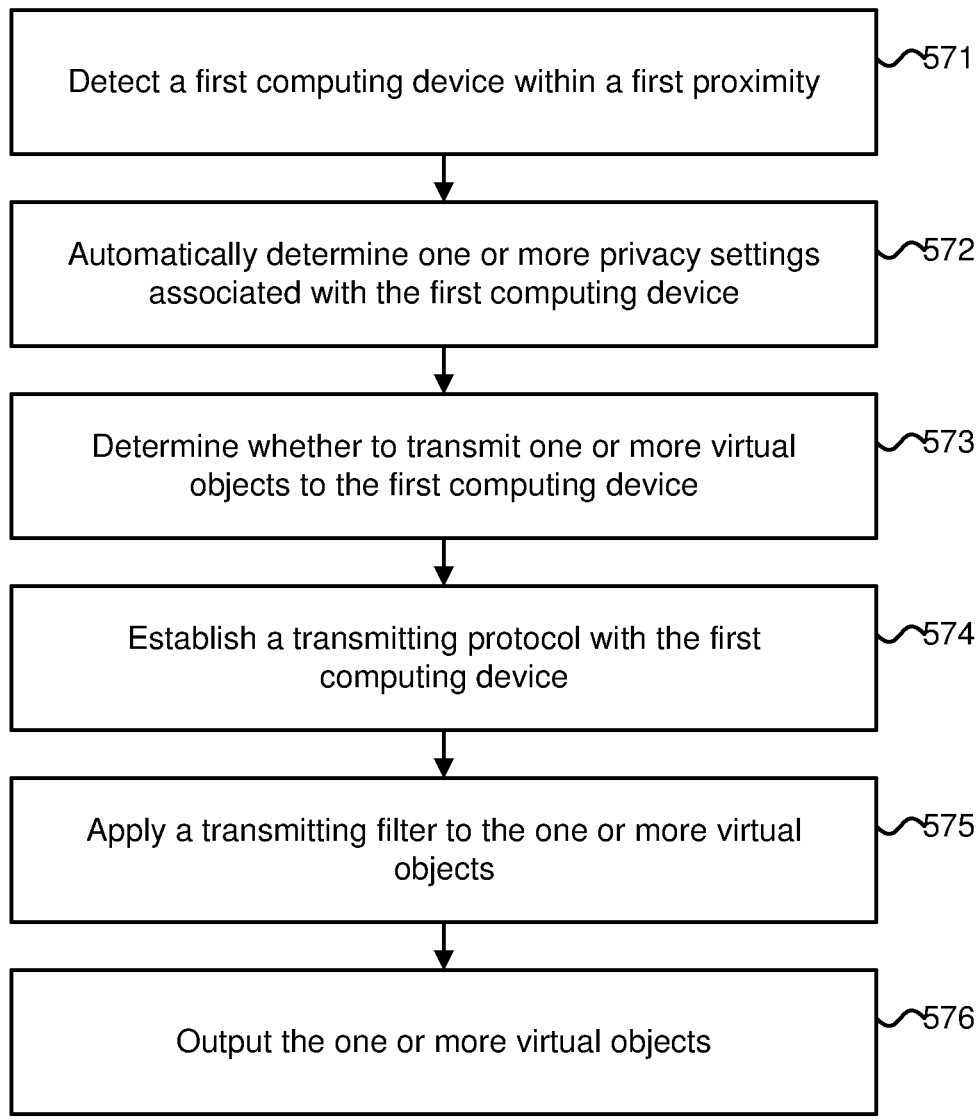
FIG. 5D is a flowchart describing one embodiment of a process for automatically transmitting virtual objects to a first computing device.

FIG. 5D is a flowchart describing one embodiment of a process for automatically transmitting virtual objects to a first computing device. The process described in FIG. 5D is one example of a process for implementing step 593 in FIG. 5A. The process of FIG. 5D may be performed continuously and by one or more computing devices. Each step in the process of FIG. 5D may be performed by the same or different computing devices as those used in other steps, and each step need not necessarily be performed by a single computing device. In one embodiment, the process of FIG. 5D is performed by a mobile device such as mobile device 140 in FIG. 1.

In step 571, a first computing device is detected within a first proximity of a mixed reality mobile device. In step 572, one or more privacy settings associated with the first computing device are automatically determined. The one or more privacy settings may be determined by inferring a particular social relationship between a person associated with the mixed reality mobile device and another person associated with the first computing device. The particular social relationship may be inferred by considering the distance to the other person or first computing device, the type of environment in which the mixed reality mobile device is located, and particular physical interactions involving the other person.

In step 573, it is determined whether to transmit one or more virtual objects to the first computing device. In one embodiment, virtual objects associated with a particular privacy setting may be transmitted to the first computing device if the first computing device is associated with the particular privacy setting. For example, virtual objects associated with a privacy setting of "business associates" may be transmitted to the first computing device if the first computing device is determined to be associated with the privacy setting of "business associates." In some embodiments, a time limit may be used to constrain the amount of time during which the virtual object information may be transmitted (or shared). The time limit may be predetermined by an end user of the mixed reality mobile device.

In step 574, a transmitting protocol with the first computing devices established. For example, a pushing protocol that allows the first computing device to receive virtual objects from a mixed reality mobile device may be established. In some embodiments, a persistent connection may be established. In step 575, a transmitting filter is applied to the one or more virtual objects. The transmitting filter may restrict the number of virtual objects outputted depending on the environment in which the mixed reality mobile device is located (e.g., a home or work environment). In step 576, the one or more virtual objects are outputted. In one example, the one or more virtual objects are transmitted to the first computing device.

FIG. 5E depicts one embodiment of table for associating virtual objects with one or more privacy settings. Each row in the table is associated with a particular virtual object via a unique virtual object identifier (object ID). As depicted in FIG. 5E, virtual object "V456" has been assigned a privacy setting represented by the privacy ID "A5" that allows information to be transmitted to any computing device (i.e., the identified group is the general public), virtual object "V234" has been assigned a privacy setting represented by the privacy ID "A4" that allows information to be transmitted to computing devices that are associated with the group identifier "acquaintances," virtual object "V789" has been assigned a privacy setting represented by the privacy ID "A3" that allows information to be transmitted to computing devices that are associated with the group identifier "friends," virtual object "V567" has been assigned a privacy setting represented by the privacy ID "A2" that allows information to be transmitted to computing devices that are associated the group identifier with "family," virtual object "V123" has been assigned a privacy setting represented by the privacy ID "A1" that does not allow information to be transmitted automatically, and virtual object "V747" has been assigned a privacy setting represented by the privacy ID "X3" that allows information to be transmitted to computing devices that are associated with the group identifier "business associates."

In some embodiments, virtual objects associated with a particular privacy setting may be transmitted to computing devices associated with that particular privacy setting and/or privacy settings that correspond with a closer relationship. For example, a virtual object associated with the privacy setting "A3" may be transmitted to computing devices associated with privacy settings "A3" or "A2" because a family relationship may be deemed closer than a friendship relationship. Moreover, a closer relationship may allow for a greater level of detail to be viewed with respect to the same virtual object. In one example, computing devices associated with the privacy setting "A4" (i.e., an acquaintance) may receive a lower resolution version of a virtual object, while computing devices associated with the privacy setting "A2" (i.e., a family member) may receive a higher resolution version of the virtual object.

FIG. 5F depicts one embodiment of a table for associating computing devices detected within a first proximity with one or more privacy settings. Each row in the table is associated with a particular computing device via a computing device identifier (device ID). As depicted in FIG. 5F, computing device "D1211" has been assigned a privacy setting represented by the privacy ID "X3" representing that it belongs to a "business associate," computing device "D2342" has been assigned a privacy setting represented by the privacy ID "X3" representing that it belongs to a "business associate," and computing device "D7832" has been assigned privacy settings represented by the privacy IDs "X3" and "A3" representing that it belongs to both a "business associate" and "friend."In this case, virtual objects associated with the privacy setting "A3" would only be transmitted to computing device "D7832."

Figure 6:
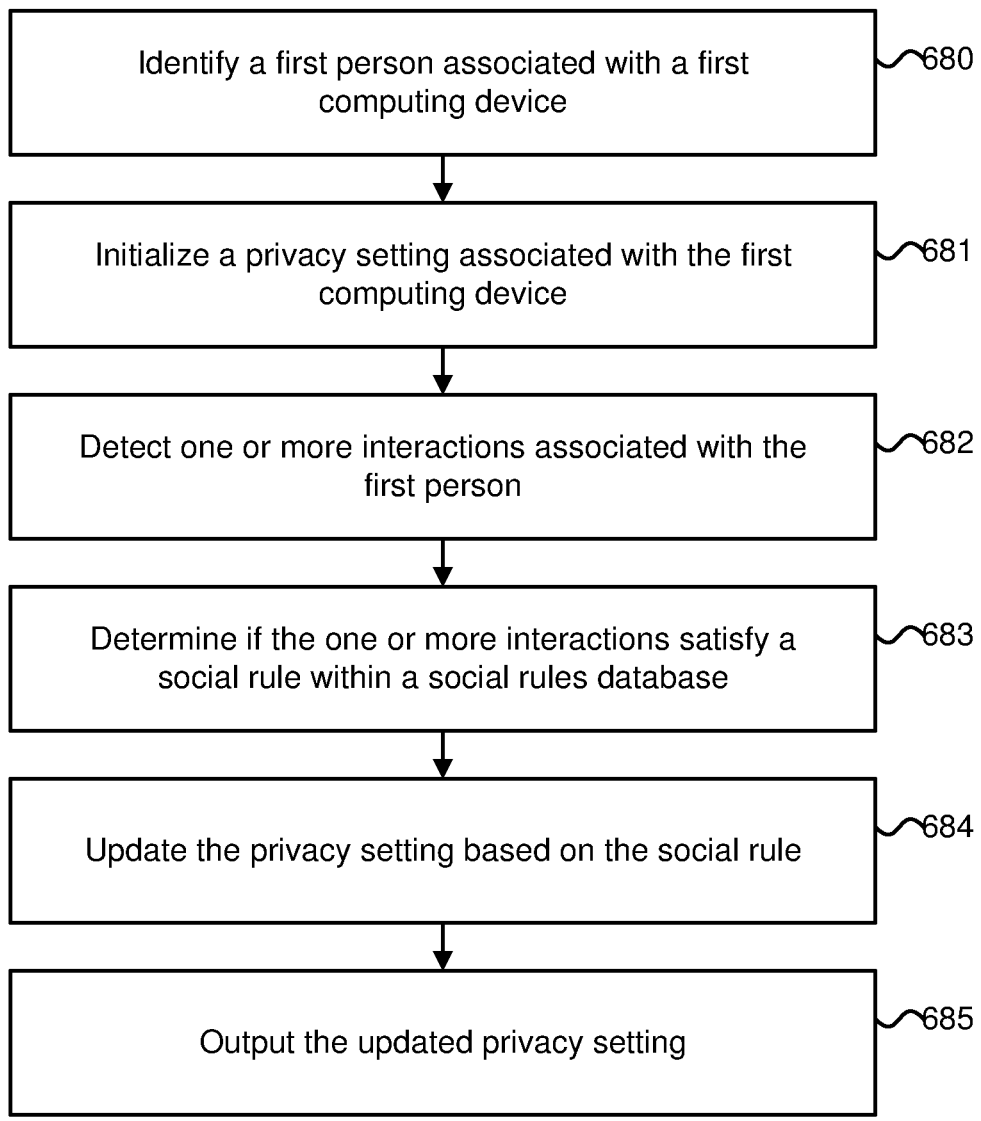
FIG. 6 is a flowchart describing one embodiment of a process for automatically determining one or more privacy settings associated with a computing device.

FIG. 6 is a flowchart describing one embodiment of a process for automatically determining one or more privacy settings (or privacy levels) associated with a computing device. The process described in FIG. 6 is one example of a process for implementing step 562 in FIG. 5C or implementing step 572 in FIG. 5D. The process of FIG. 6 may be performed continuously and by one or more computing devices. Each step in the process of FIG. 6 may be performed by the same or different computing devices as those used in other steps, and each step need not necessarily be performed by a single computing device. In one embodiment, the process of FIG. 6 is performed by a mobile device such as mobile device 140 in FIG. 1.

In step 680, a first person associated with a first computing device is identified. The first person may be identified via image processing techniques such as facial recognition techniques and/or voice recognition techniques. In step 681, a privacy setting associated with the first computing device is initialized. In one example, a default privacy setting of "public" may be used. In step 682, one or more interactions associated with the first person are detected. The one or more interactions may include physical contact and/or touching by the first person (e.g., a hug, high-five, or handshake). The one or more interactions may also include the first person being in close proximity to a particular HMD and speaking towards the particular HMD.

In step 683, it is determined whether the one or more interactions detected in step 682 satisfy a social rule within a social rules database. The social rules database may exist locally on a mobile device. Some examples of social rules may include the existence of a particular object within a predetermined distance of a mobile device (e.g., a first person is within 10 feet of the mobile device), particular physical contact with the particular object (e.g., the first person gives a prolonged hug), detection of the first person smiling for an extended period of time, or detection of the first person being in close proximity for an extended period of time. The first person may be identified through object recognition, facial recognition, or voice recognition. The social rules may also consider other human social cues such as voice stress, significant voice changes, eye blinking rate, or sudden hand movements. Personal online resources may also be accessed and considered such as personal calendars, contact lists, and social networking settings. Social graphs may also be traversed in order to infer a degree of relationship between two people.

In one embodiment, a social rule may require close proximity to one or more co-workers (e.g., within 20 feet of each other) and a corresponding work calendar entry for a work meeting with the one or more co-workers in order to be satisfied. For example, a work calendar entry associated with an end user of an HMD may comprise a work meeting with a first person during a particular period of time. In this case, work-related virtual objects (i.e., those virtual objects associated with a privacy setting of "business associate") may be automatically shared with the first person if the first person is within the required proximity during the particular period of time. Moreover, other work-related virtual objects being projected on the first person's HMD may be automatically shared with the end user and displayed on the end user's HMD.

In step 684, the privacy setting associated with the first computing device is updated based on a satisfied social rule. For example, the privacy setting associated with the first computing device may be changed from "public" to "business associate." In step 685, the updated privacy setting is outputted. In some embodiments, the updated privacy setting may be used to update a table associating computing devices detected within a first proximity with one or more privacy settings.

Figure 7:
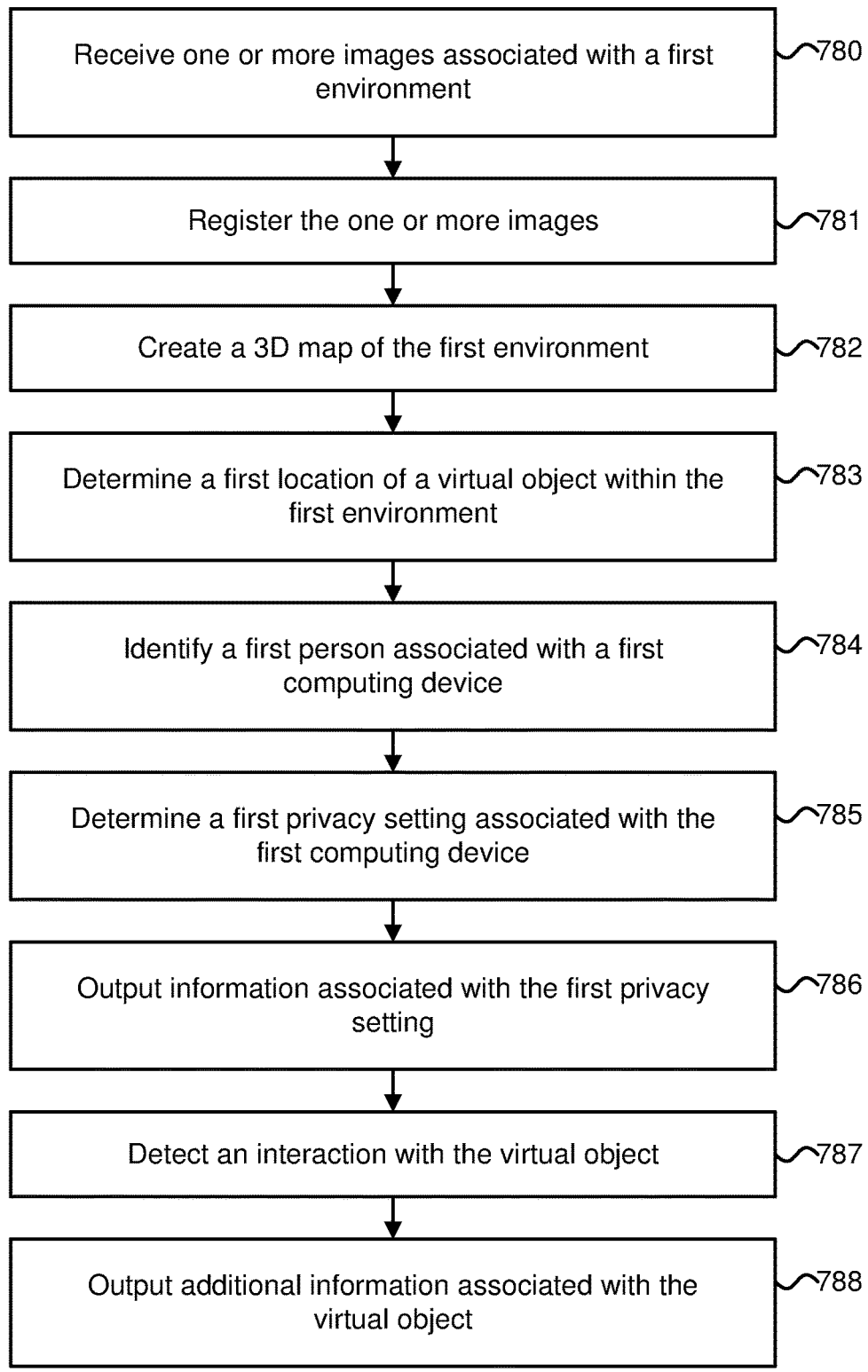
FIG. 7 is a flowchart describing one embodiment of a process for outputting additional information associated with a particular virtual object upon detection of an interaction with the particular virtual object.

FIG. 7 is a flowchart describing one embodiment of a process for outputting additional information associated with a particular virtual object upon detection of an interaction with the particular virtual object. The process of FIG. 7 may be performed continuously and by one or more computing devices. Each step in the process of FIG. 7 may be performed by the same or different computing devices as those used in other steps, and each step need not necessarily be performed by a single computing device. In one embodiment, the process of FIG. 7 is performed by a mobile device such as mobile device 140 in FIG. 1.

In step 780, one or more images associated with the first environment are received. In step 781, the one or more images are registered. In step 782, a 3-D map of the first environment is created. More information regarding the generation of 3-D maps can be found in U.S. patent application Ser. No. 13/152,220, "Distributed Asynchronous Localization and Mapping for Augmented Reality," incorporated herein by reference in its entirety.

In step 783, a first location of a virtual object within the first environment is determined. The virtual object may be generated by a mixed reality mobile device. The first location may be specified relative to the 3-D map created in step 782. In step 784, a first person associated with a first computing device is identified. The first person may be identified through object recognition, facial recognition, or voice recognition. The first computing device may be identified via RF identification. In step 785, a first privacy setting associated with the first computing device is determined.

The first privacy setting may be determined using processes similar to those discussed with respect to step 572 of FIG. 5D.

In step 786, information associated with the first privacy setting is outputted. For example, general advertising information may be transmitted to computing devices associated with a "public" privacy setting. In step 787, an interaction with the virtual object is detected. The interaction with the virtual object may include the first person being located within a close proximity to or virtually touching the virtual object, or the first computing being located within a close proximity to the virtual object (i.e., located within a predetermined distance of the first location). In step 788, additional information associated with the virtual object is outputted in response to the detected interaction in step 787. The additional information may be based on the type of interaction detected in step 787. Further, the additional information may be revealed to the first computing device in stages as the first person gets closer to the virtual object.

In one embodiment, a store owner may create a publically available virtual object that may be perceived to exist outside the store owner's store. The publicly available virtual object may comprise a virtual sign (e.g., an advertisement) or a virtual display (e.g., a dancing latte in front of a coffee shop). In some embodiments, the virtual object transmitted to a particular HMD may be automatically updated and depend on one or more privacy settings associated with the particular HMD (e.g., frequent customers of the coffee shop may perceive a different virtual sign than general members of the public). The virtual sign transmitted to the particular HMD may also be based on information regarding the particular HMD end user's interests or preferences (e.g., an end user who is identified to like hot drinks may see a different virtual sign than an end user who is identified to like cold drinks). Upon detection of an interaction with the virtual object, additional information (e.g., such as information associated with a digital coupon) may be transmitted to the particular HMD.

Figure 8:
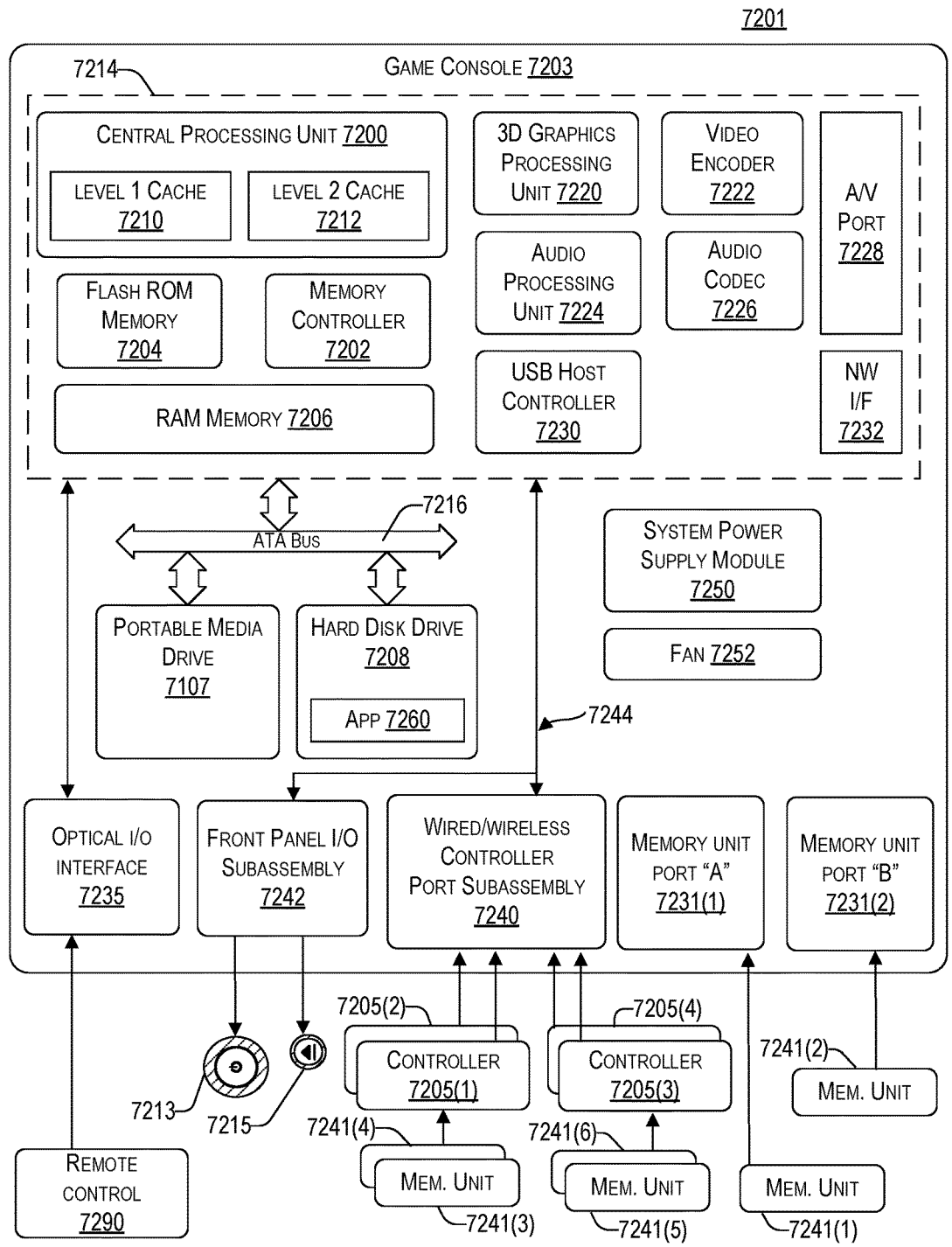
FIG. 8 is a block diagram of an embodiment of a gaming and media system.
Figure 9:
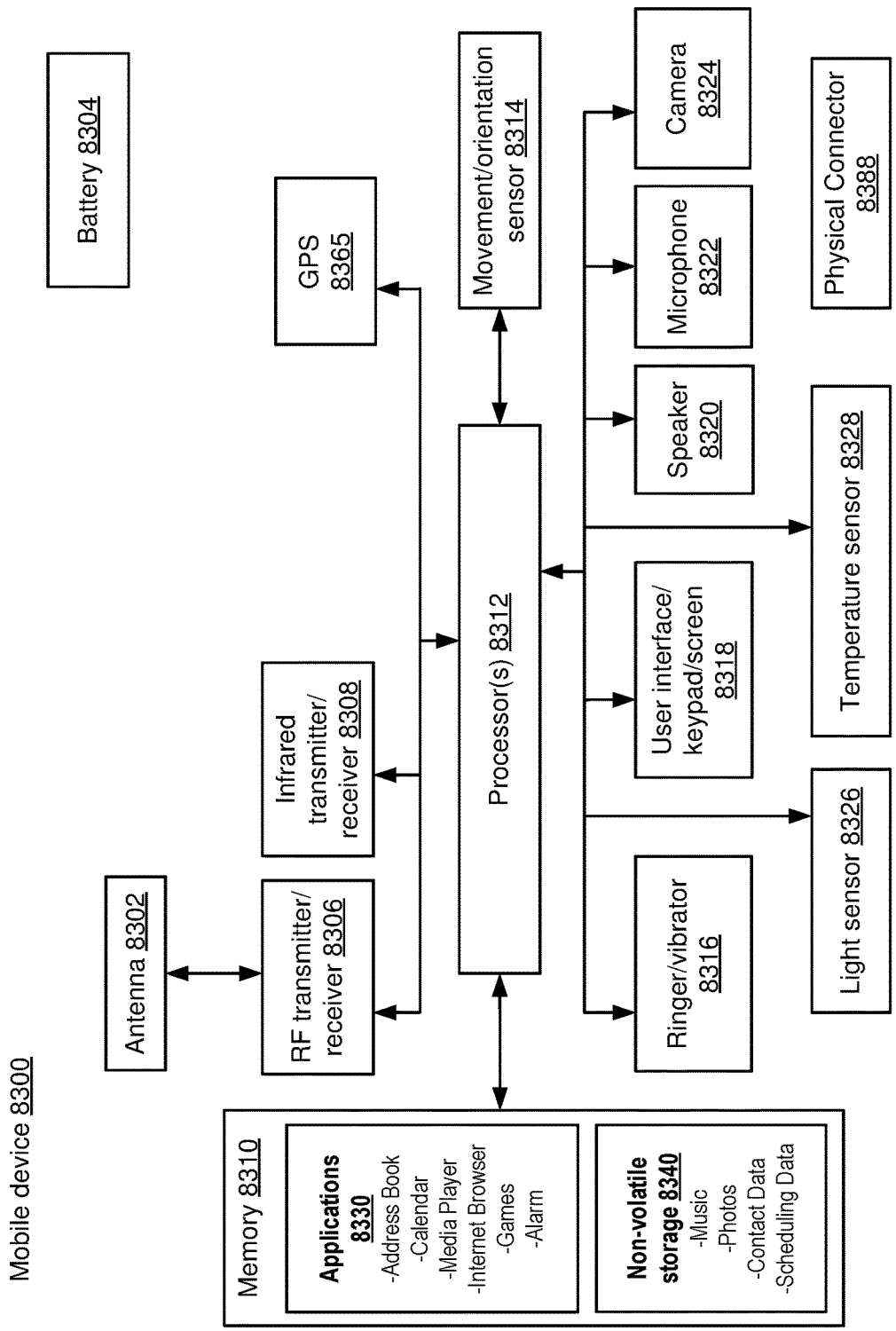
FIG. 9 is a block diagram of one embodiment of a mobile device.
Figure 10:
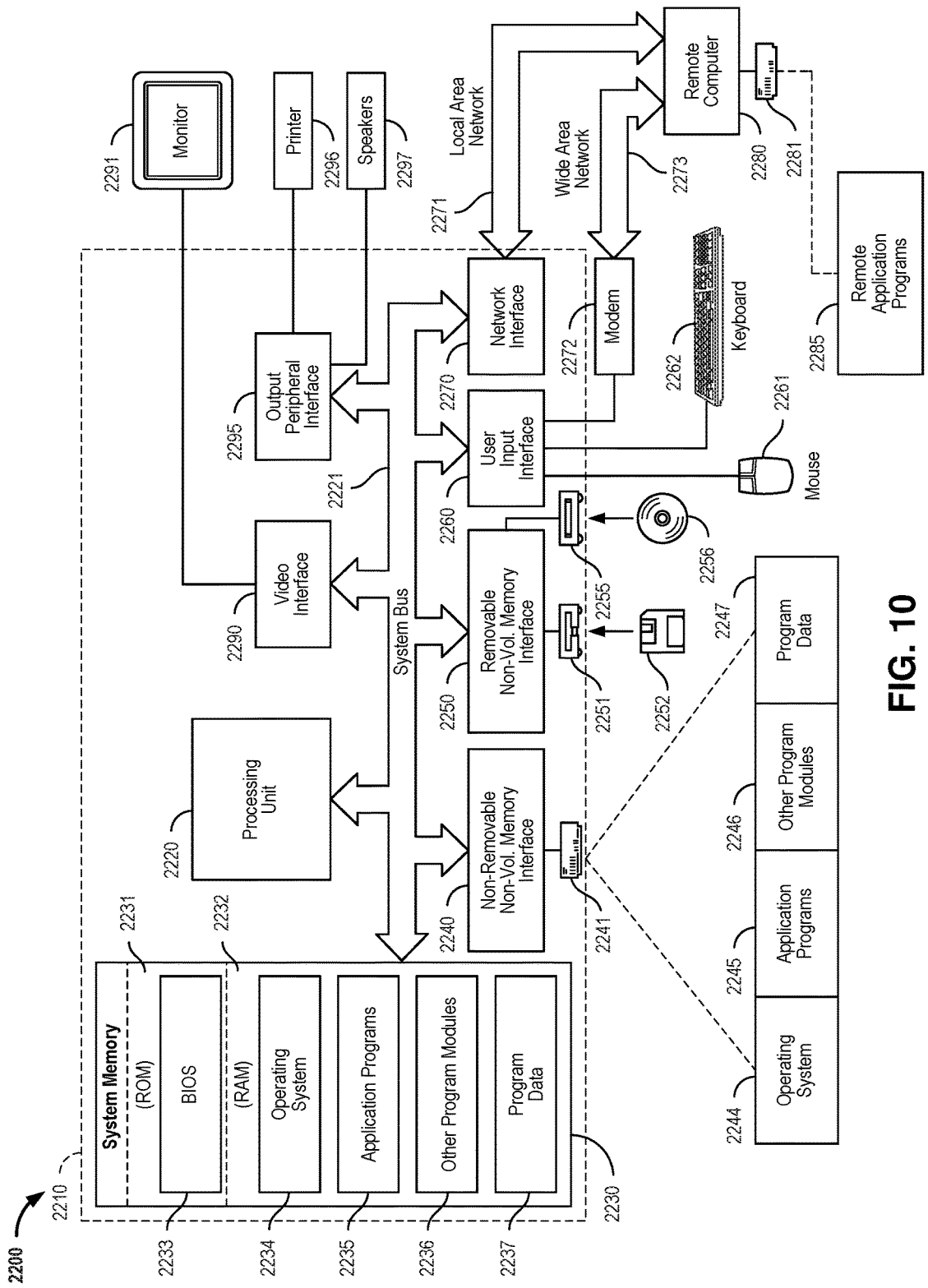
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201, which is one example of computing environment 12 in FIG. 3D. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an A/V (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file.

When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300, such as mobile device 140 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computer 130 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    identifying, by a first image processing operation, a particular person within a field of view of a head mounted display (HMD) device;
    detecting, by a second image processing operation, that a user of the HMD device has performed a gesture directed towards the particular person, wherein the gesture includes the user of the HMD device touching the particular person;
    determining whether the gesture satisfies one or more social rules, wherein the one or more social rules correspond to a social relationship with the particular person based on an environment surrounding the user of the HMD device and the particular person, a distance between the user of the HMD device and the particular person, a vocal expression or a facial expression of the particular person towards the user of the HMD device, and a period of time coinciding with an electronically scheduled meeting between the user of the HMD device and the particular person;
    acquiring virtual data associated with an application for an augmented reality environment to be displayed in response to the one or more social rules being satisfied, wherein the application corresponds to the electronically scheduled meeting between the user of the HMD device and the particular person; and
    displaying the application using the HMD device.

2. The method of claim 1,
    wherein the application corresponds to an electronic calendar.

3. The method of claim 1, wherein:
    the gesture is one of a handshake gesture, a hug gesture, or a high-five gesture.

4. The method of claim 1, wherein:
    the detecting that the user of the HMD device has touched the particular person includes performing skeletal tracking of the particular person.

5. The method of claim 1, wherein:
    the acquiring the virtual data includes acquiring a plurality of virtual objects displayed within the augmented reality environment.

6. The method of claim 5, further comprising:
    transmitting other virtual data associated with a second augmented reality environment displayed to the user of the HMD device to a mobile device displaying the plurality of virtual objects to the particular person.

7. The method of claim 6, wherein:
    the transmitting the other virtual data to the mobile device includes transmitting, to the mobile device, a set of virtual objects displayed using the HMD device at a point in time coinciding with an electronically scheduled meeting between the user of the HMD device and the particular person.

8. A head mounted display (HMD) device, comprising:
    a display;
    a memory storing instructions; and
    one or more processors communicatively coupled with the display and the memory and configured to:
        identify, by a first image processing operation, a particular person within a field of view of the display;
        detect, by a second image processing operation, that a user of the HMD device has performed a gesture directed towards the particular person, wherein the gesture includes the user of the HMD device touching the particular person;
        determine whether the gesture satisfies one or more social rules, wherein the one or more social rules correspond to a social relationship with the particular person based on an environment surrounding the user of the HMD device and the particular person, a distance between the user of the HMD device and the particular person, a vocal expression or a facial expression of the particular person towards the user of the HMD device, and a period of time coinciding with an electronically scheduled meeting between the user of the HMD device and the particular person; and
        acquire virtual data associated with an application for an augmented reality environment to be displayed in response to the one or more social rules being satisfied, wherein the application corresponds to the electronically scheduled meeting between the user of the HMD device and the particular person,
    wherein the display is configured to display the application subsequent to acquisition of the virtual data.

9. The HMD device of claim 8,
    wherein the application corresponds to an electronic calendar.

10. The HMD device of claim 8, wherein the gesture is one of a handshake gesture, a hug gesture, or a high-five gesture.

11. The HMD device of claim 8, wherein the one or more processors is further configured to:
    perform skeletal tracking of the particular person; and
    detect that the user of the HMD device has touched the particular person based on the skeletal tracking.

12. The HMD device of claim 8, wherein the one or more processors is further configured to:
    transmit other virtual data associated with a second augmented reality environment displayed to the user of the HMD device to a mobile device displaying the virtual data to the particular person.

13. The HMD device of claim 12, wherein the one or more processors is further configured to transmit, to the mobile device, a set of virtual objects displayed using the HMD device.

14. The HMD device of claim 8, wherein the display comprises a see-through display.

15. One or more non-transitory storage devices containing processor readable code for programming one or more processors, comprising:
    processor readable code configured to identify, by a first image processing operation, a particular person within a field of view of a display of a head mounted display (HMD) device;
    processor readable code configured to detect, by a second image processing operation, that a user of the HMD device has performed a gesture directed towards the particular person, wherein the gesture includes the user of the HMD device touching the particular person;
    processor readable code configured to determine whether the gesture satisfies one or more social rules, wherein the one or more social rules correspond to a social relationship with the particular person based on an environment surrounding the user of the HMD device and the particular person, a distance between the user of the HMD device and the particular person, a vocal expression or a facial expression of the particular person towards the user of the HMD device, and a period of time coinciding with an electronically scheduled meeting between the user of the HMD device and the particular person;

processor readable code configured to acquire virtual data associated with an application for an augmented reality environment to be displayed in response to the one or more social rules being satisfied, wherein the application corresponds to the electronically scheduled meeting between the user of the HMD device and the particular person; and processor readable code configured to display the virtual data application using the HMD device.

\* \* \* \* \*